(12) United States Patent
Wu et al.

(10) Patent No.: US 10,012,754 B2
(45) Date of Patent: Jul. 3, 2018

(54) ENHANCED FORMATION EVALUATION USING HIGH-FREQUENCY DIELECTRIC AND ARRAY INDUCTION TOOLS

(71) Applicant: HALLIBURTON ENERGY SERVICES, INC., Houston, TX (US)

(72) Inventors: Dagang Wu, Katy, TX (US); Junsheng Hou, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 164 days.

(21) Appl. No.: 15/035,299

(22) PCT Filed: Mar. 19, 2014

(86) PCT No.: PCT/US2014/031230
§ 371 (c)(1),
(2) Date: May 9, 2016

(87) PCT Pub. No.: WO2015/142328
PCT Pub. Date: Sep. 24, 2015

(65) Prior Publication Data
US 2016/0291195 A1    Oct. 6, 2016

(51) Int. Cl.
*G01V 3/28* (2006.01)
*G01V 3/38* (2006.01)
*E21B 49/00* (2006.01)

(52) U.S. Cl.
CPC ............ *G01V 3/28* (2013.01); *E21B 49/00* (2013.01); *G01V 3/38* (2013.01)

(58) Field of Classification Search
CPC ............ G01V 3/28; G01V 3/38; E21B 49/00
See application file for complete search history.

(56) References Cited

U.S. PATENT DOCUMENTS

| 5,329,448 A | 7/1994 | Rosthal et al. |
| 9,611,731 B2 * | 4/2017 | Hou ............... E21B 47/022 |

(Continued)

OTHER PUBLICATIONS

International Patent Application No. PCT/US2014/031230, International Search Report and Written Opinion, dated Dec. 16, 2014, 11 pages.

*Primary Examiner* — Bryan Bui
(74) *Attorney, Agent, or Firm* — Kilpatrick Townsend & Stockton LLP

(57) ABSTRACT

In some aspects, systems and methods are provided for determining formation properties using data from both a high-frequency dielectric tool (HFDT) and an array induction tool (AIT). The system includes a controller in communication with at least one HFDT, at least one ART (which may be a multi-component AIT), and a processing unit. The acquired ART formation data can be processed and used to set constraints on the processing of the acquired HFDT formation data. In aspects, a set of processed HFDT data can be used to reinitialize the ART data processing, to allow for a repeated or iterative evaluation process. The system and method generate values used to determine one or more formation properties such as a resistivity of the formation, the presence of an invasion in the formation, mud resistivity or permittivity, anisotropy characteristics of the formation, and dipping characteristics of the formation.

19 Claims, 14 Drawing Sheets

(56) References Cited

U.S. PATENT DOCUMENTS

| | | | |
|---|---|---|---|
| 2005/0083061 A1* | 4/2005 | Tabanou | G01V 3/28 324/334 |
| 2007/0257679 A1 | 11/2007 | Fanini et al. | |
| 2008/0231283 A1 | 9/2008 | Nikitenko et al. | |
| 2011/0309835 A1 | 12/2011 | Barber et al. | |
| 2013/0027043 A1 | 1/2013 | Li et al. | |

* cited by examiner

ENHANCED FORMATION EVALUATION USING HIGH-FREQUENCY DIELECTRIC AND ARRAY INDUCTION TOOLS

CROSS-REFERENCE TO RELATED APPLICATIONS

This is a U.S. national phase under 35 U.S.C. 371 of International Patent Application No. PCT/US2014/031230, titled "Enhanced Formation Evaluation Using High-Frequency Dielectric and Array Induction Tools" and filed Mar. 19, 2014, the entirety of which is incorporated herein by reference.

TECHNICAL FIELD

The present disclosure relates generally to devices for use in a wellbore in a subterranean formation and, more particularly (although not necessarily exclusively), to a use of a high-frequency dielectric tool, an array induction resistivity tool, and related processors and algorithms for resistivity logging systems and methods.

BACKGROUND

Various devices can be utilized in a well traversing a hydrocarbon-bearing subterranean formation. In some well systems, wireline resistivity logging tools or other resistivity logging tools can determine the resistivity or otherwise evaluate characteristics of a geological formation from which hydrocarbons are extracted. Determining the resistivity or other characteristics of the geological formation may involve transmitting electrical signals into the formation, detecting returns of the electrical signals, and calculating the resistivity or other characteristics based on one or both of the voltage amplitudes and the phase of the returned signals.

Both high-frequency dielectric tools (HFDT) and array induction resistivity tools (ART) have been independently used to estimate formation resistivity and other formation parameters. Approaches using HFDT can result in data logs and estimates that are limited at least in part by the relatively shallow depth of evaluation possible with an HFDT. Approaches using ART can result in data logs and estimates that are limited at least in part by the relatively inferior detail, the precision possible with an ART, other tool-based limitations, or combinations thereof.

DETAILED DESCRIPTION

Figure 1:
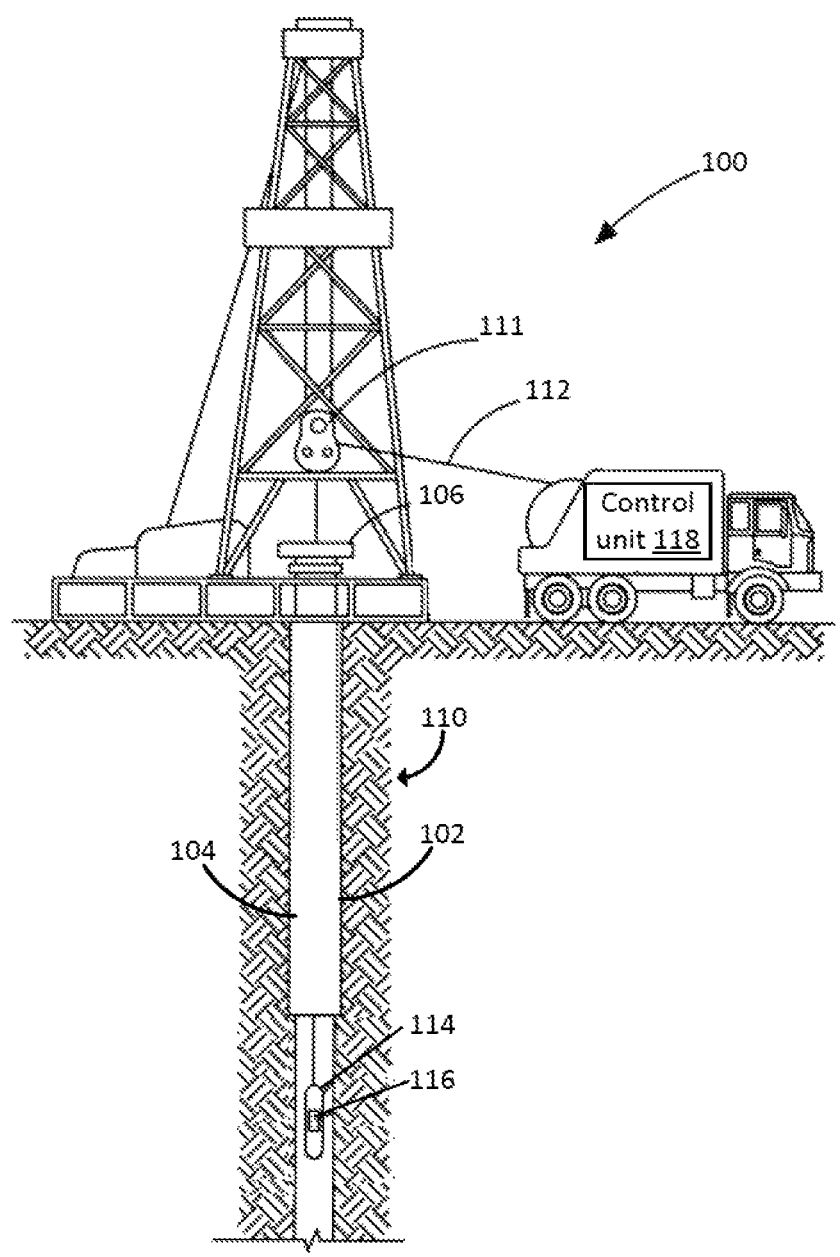
FIG. 1 is a schematic diagram of an example of a well system in which a resistivity logging tool can be deployed, which can include a high-frequency dielectric tool (HFDT) and an array induction resistivity tool (ART), according to one aspect of the present disclosure.

Certain aspects and examples of the disclosure herein are directed to a processing method combining data acquired from resistivity logging tools, specifically high-frequency dielectric tools (HFDT) and array induction resistivity tools (ART), to generate a data set for evaluating a formation. In some aspects, a system can acquire and combining formation data (alternatively referred to as "data logs") from both a HFDT and an ART are provided. The system includes at least one HFDT and at least one ART that are both used to acquire formation data of a formation from within a wellbore. The HFDT and ART of the system can both account for the effect of mud or mud cakes that are formed during the drilling of the wellbore in the formation, which can reside in between the sensors of the HFDT and ART and may interfere with the acquisition of the formation data. The system, further having a controller and a processing unit, can process both the acquired ART data and the acquired HFDT data of the formation, and use either set of processed data to aid in optimizing the processing of the other set of data. The processing of the data from both tools can be performed in any suitable sequence (e.g., simultaneously, concurrently, sequentially, or alternatingly).

In some embodiments, the acquired ART data can be processed and used to set constraints on the processing of the acquired HFDT data. In other embodiments, a set of processed HFDT data can be used as initial parameters to perform additional iterations of the ART data processing, to allow for a repeated or iterative evaluation process. In further embodiments, the acquired ART formation data and acquired HFDT data can be simultaneously processed with joint inversion algorithms to generate a result. The system and methods generate values used to evaluate a formation, typically including resistivity for one or more of the formation, any invasions, any mud, or combinations thereof. The system and methods generate values used to evaluate a formation can further include one or both of anisotropy and dipping characteristics of the formation.

An "invasion" as used herein, refers to a non-hydrocarbon fluid or material (such as water) that interrupts, breaks, or leaks into a formation of hydrocarbons in and around a borehole. The invasion, or invasion-zone, is detectable by a resistivity sensor tool, within the area and depth that the sensor can detect.

Processing approaches that combine log data from both HFDT and ART can enhance the estimation of formation properties, particularly enhancing results as estimated using high-frequency dielectric tools. By using available formation parameters computed from ART as initial values (such as mud resistivity, invasion resistivity, and formation resistivity) and constraint thresholds in HFDT processing, more accurate solutions can be achieved than by either HFDT processing or ART processing alone. Moreover, the use of ART data logs in combination with HFDT processing approaches can make the process of estimating formation properties with HFDT both more efficient than by either HFDT processing or ART processing alone.

In some embodiments, the combined systematic processing involves acquiring data from both a HFDT and an ART. In aspects, the data received from the HFDT and the ART logs are aligned to ensure that the acquired HFDT data and the ART data both refer to the same depth and location of investigation in the formation. From the aligned data, an estimate of formation properties such as mud resistivity ($R_m$), invasion-zone resistivity ($R_{xo}$), horizontal formation resistivity ($R_h$), vertical formation resistivity ($R_v$), and dip of the formation relative to the sensory tools (dip) is made based on the ART data logs. In some aspects, the formation data acquired from an ART and HFDT can be referred to as a first set of formation data and a second set of formation data, respectively. In other aspects, depending on the particular application of acquired formation data, the formation data acquired from an ART and HFDT can be referred to as a second set of formation data and a first set of formation data, respectively.

In some embodiments with a MCI tool, anisotropy and dipping corrections can be applied to the HFDT log data, correcting HFDT log data for any differences resulting from the direction of measurement (i.e. anisotropic effects) and for any affects due to the angle or subterranean slope of the formation and earth strata (i.e. dipping effects). The ART data logs can determine if an invasion is present in the formation at the depths of investigation ("DOI") and location evaluated by the ART. If an invasion is present, the HFDT processing can be conducted using the $R_m$ and $R_{xo}$ values from the ART as the initial $R_m$ and $R_f$ respectively, values and constraint thresholds for the HFDT analysis. If an invasion is not present, the HFDT processing can be conducted using the shortest spacing $R_m$ and $R_h$ values as the initial $R_m$ and $R_f$ respectively, values and constraint thresholds for the HFDT analysis. The data logs as processed according to HFDT analysis can be output for further display, analysis, manipulation, or combinations thereof.

Figure 12:
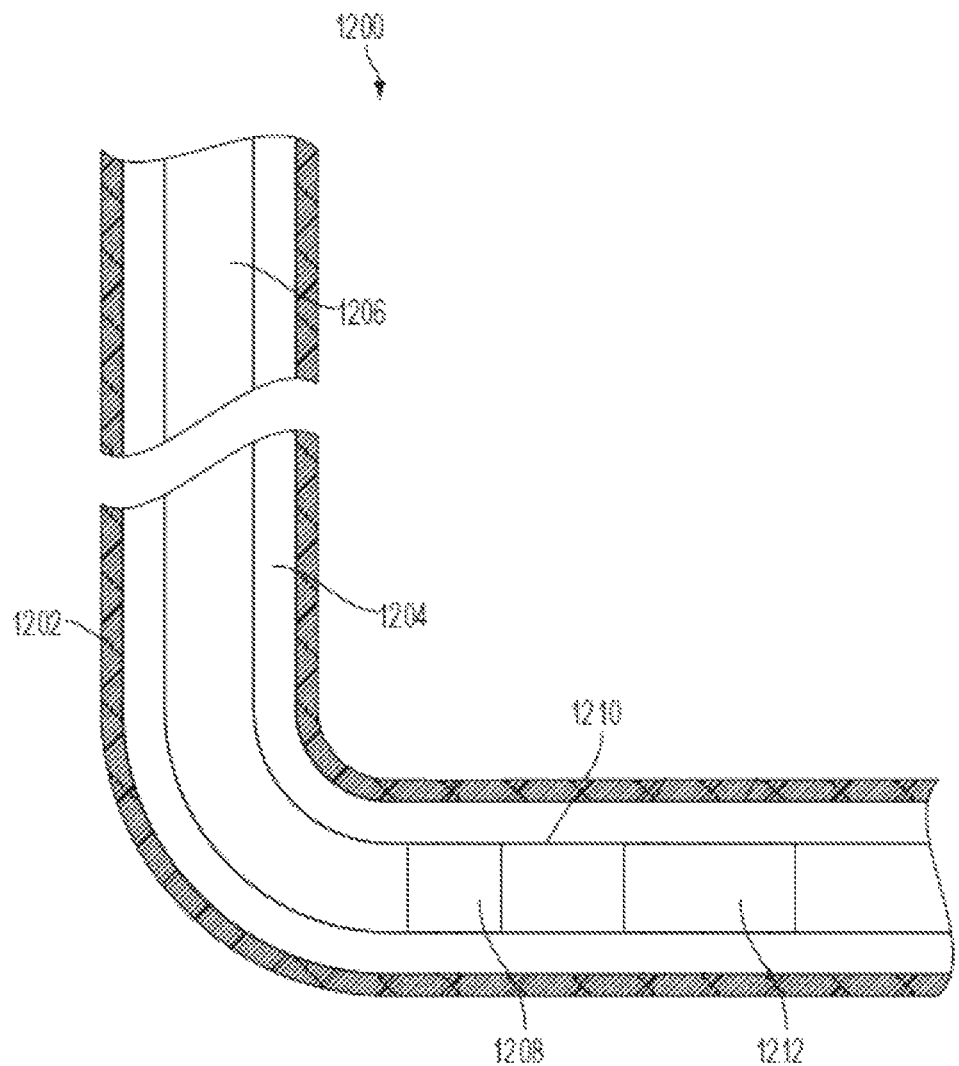
FIG. 12 is a schematic representation of an apparatus and well system having a resistivity logging tool that can include an HFDT and an ART, according to one aspect of the present disclosure.

In some embodiments, the analysis can be run through multiple iterations in order to additionally refine the results and develop a more accurate and precise estimation of a formation. The determination of whether additional data refinement is needed can be based upon the number of previous refinements (if any) applied to the data, variance between the original ART logs and HFDT logs, a preset requirement for processing, error confidence calculations, or other analysis of the formation evaluation data. When additional refinement of the results is desired, the results of HFDT analysis can be used to reinitialize the processing of the acquired ART data logs. The estimate of formation properties as based on the refined ART data logs, along with any related anisotropy and dipping corrections, can be used to redetermine values and constraint thresholds for analysis of the HFDT data logs. Thus, the formation evaluation data set given by the system and method can be a combination of HFDT and ART formation data, where one data set is used to refine the other, or where both data sets are used to refine each other. In some aspects, the methods described herein can be used with a wireline conveyance, as depicted in FIG. 1. In other aspects, the methods described herein can be used with other forms of conveyance, as depicted in FIG. 12.

These illustrative examples are given to introduce the reader to the general subject matter discussed here and are not intended to limit the scope of the disclosed concepts. The foregoing sections describe various additional aspects and examples with reference to the drawings in which like numerals indicate like elements, and directional descriptions are used to describe the illustrative aspects. Like the illustrative aspects, the numerals and directional descriptions included in the following sections should not be used to limit the disclosed concepts.

Throughout this description for the purposes of explanation, numerous specific details are set forth in order to provide a thorough understanding of the many embodiments disclosed herein. It will be apparent, however, to one skilled in the art that the many embodiments may be practiced without some of these specific details. In some instances, well-known structures and devices are shown in diagram or schematic form to avoid obscuring the underlying principles of the described embodiments. In other instances, flowcharts describing exemplary processes or methods are shown in a simplified form to avoid confusing the underlying principles of the described embodiments.

FIG. 1 is a schematic diagram of an example of a well system 100 in which a resistivity logging tool 114 can be deployed. The well system 100 includes a wellbore 102 extending through various earth strata. The wellbore 102 extends through a hydrocarbon bearing subterranean formation 110. A casing string 104 extends from the surface 106 to the subterranean formation 110. The casing string 104 can provide a conduit via which formation fluids, such as production fluids produced from the subterranean formation 110, can travel from the wellbore 102 to the surface 106.

The well system 100 can also include at least one resistivity logging tool 114. The resistivity logging tool 114 coupled to a cable 112 can be deployed into the wellbore 102 using a winch 111. The resistivity logging tool 114 can be used to determine the resistivity of a formation 110. The resistivity logging tool 114 can include a controller 116 for controlling operations of the resistivity logging tool 114. The resistivity logging tool 114 can be communicatively coupled to a control unit 118 at the surface of the well system 100. A non-limiting example of a control unit 118 is a computing device such as desktop computer or other suitable computing device. The control unit 118 can process data received from the resistivity logging tool 114 to determine characteristics of the formation 110.

Although FIG. 1 depicts a single resistivity logging tool 114 deployed in the wellbore 102, any number of resistivity logging tools can be deployed in the well system 100.

In some aspects, the resistivity logging tool 114 can include either or both of a frequency dielectric tool (HFDT) and an array induction resistivity tool (ART), configured to be positioned within a wellbore 102 to acquire formation data. Although the well system 100 is depicted with one casing string 104, any number of tools can be used in the well system 100. similarly, in various embodiments, the resistivity logging tool 114 can include only a HFDT, only an ART, or both a HFDT and an ART. Similarly, in embodiments, a casing string 104 or resistivity logging tool 114 may include sensory tools in addition or complementary to an ART and HFDT.

In aspects, a HFDT that is part of a resistivity logging tool 114 can include HFDT transmitters and receivers (represented schematically in FIG. 3 below) positioned to be in contact with the earth of the subterranean formation 110. Similarly, an ART that is part of a resistivity logging tool 114 can include ART transmitters and ART receivers (represented schematically in FIG. 5A below) positioned to be in contact with the earth of the subterranean formation 110. In some embodiments, the ART receivers can be a receiver triad, which includes both main receivers and bucking receivers. In other embodiments, the ART may be a multicomponent array induction (MCI) tool having multiple ART receivers or receiver triads. One or both of the HFDT and ART can be controlled to emit and receive signals to determine the characteristics of the formation, particularly evaluating the formation to detect the present of hydrocarbons, water, or other components in the earth strata.

In some environments, the wellbore 102 may include mud or mud cakes, generated from the drilling of the wellbore 102 and located between the area of the formation to be evaluated and either or both of the transmitters and receivers. The mud or mud cake can interfere with the measurement of the formation by the HFDT and the ART. A standoff distance between the area of the formation to be evaluated and the transmitters or receivers of the resistivity logging tool 114 can correspond to the thickness of the mud or mud cake. The standoff distance can be accounted for in correcting the acquired formation data.

Figure 2:
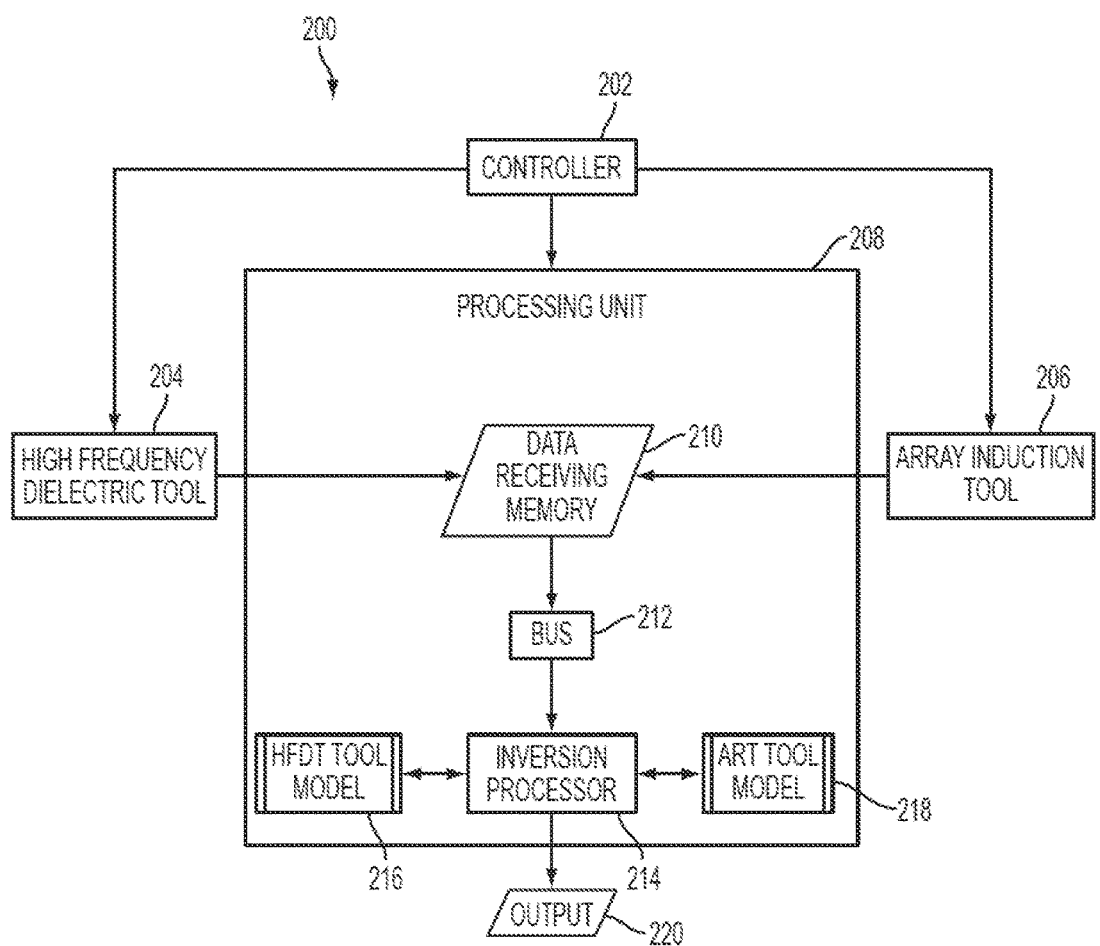
FIG. 2 is a flowchart depicting an example of collecting, combining, and processing of data from both an HFDT and an ART according to one aspect of the present disclosure.

FIG. 2 is a is a block diagram 200 depicting an example controller 202 for an HFDT 204, an ART 206, and a processing unit 208 for data logs received from one or both of the HFDT 204 and ART 206.

The controller 202 includes at least a processing device, a memory device, and a bus, and can include one or more electronic devices implemented using a printed circuit board ("PCB"). The controller 202 can send instructions to the HFDT 204 and ART 206 to have the sensory tools operate and collect formation data from the wellbore in which the HFDT 204 and ART 206 are inserted. The controller 202 can further receive data logs from the HFDT 204 and ART 206, or direct the HFDT 204 and ART 206 to send the acquired data regarding the formation to a data receiving memory 210, which is a component of the processing unit 208.

A non-limiting example of a controller 202 is a computing device such as desktop computer, a computer interface coupled to a wellbore-related apparatus, or other suitable computing device. The controller 202 is also operable to control and configure the strength of the signals used by the transmitter devices of one or both of the HFDT 204 and ART 206. In some embodiments, the controller 202 can communicate with either one or both or the HFDT 204 and ART 206 via wireline, slickline, or other long signal wire communication couplings as used for wellbore sensors. In alternative embodiments, a communication bus or other data controller coupling can be used to electrically connect and communicatively connect the controller 202 with the one or both of HFDT 204 and ART 206, and in turn connect with the processing unit 208. In some aspects, the controller 202 can be at least in part include one or more processors located on the casing string 104, electronically coupled to the resistivity logging tool 114 and either or both or the HFDT 204 and ART 206.

The data logs from the HFDT 204 and ART 206 are received by the processing unit 208, specifically by the data receiving memory 210. The HFDT data logs and ART data logs can be further transferred within the processing unit 208 via a communications bus 212. From the bus 212, the HFDT data logs and ART data logs can be transmitted to an inversion processing module 214 where the desired inversion algorithms can be run on the received data. In some aspects, the inversion processing module 214 can include executable code stored in the memory 210 that can be executed by the processing unit 208.

To process the inversion calculations, the HFDT data logs may be sent to an HFDT modeling module 216 to calculate parameter values used to complete the inversion calculations. Similarly, either simultaneously or sequentially, the ART data logs may be sent to an ART modeling module 218 to calculate parameter values to complete the inversion calculations. The parameter values calculated by the HFDT modeling module 216 and the ART modeling module 218 may be separate estimations of the same formation parameter or calculations of different formation parameters. Such data logs, often resistivity data, can be sent to the appropriate tool modeling module processors simultaneously, concurrently, sequentially, alternatingly, or in any order as necessary to optimize the processing operations. In some embodiments, data returned from one or both of the HFDT modeling module 216 and ART modeling module 218 to the inversion processing module 214 can be iteratively processed via one or both of the HFDT modeling module 216 and ART modeling module 218 multiple times to further refine, correct, or optimize the data logs and related measured parameters. In aspects, both the HFDT modeling module 216 and the ART modeling module 218 can include executable code stored in the memory 210 that can be executed by the processing unit 208.

An HFDT that can be deployed as part of a resistivity logging tool 114 in a wellbore through a fluid-producing formation emits an electromagnetic wave and measures the propagation time and the attenuation of the electromagnetic wave as it passes through a specific interval of the formation. The propagation time of the electromagnetic wave through water is substantially higher than that in hydrocarbons and is practically constant for most salinities. Saturation estimations from data sensed by the HFDT can be used to calculate the resistivity of the formation. The calculated resistivity of the formation can be used to distinguish between oil, gas, or other hydrocarbons, and water in formation reservoirs. In further embodiments, an HFDT can also measure and calculate the dielectric permissively of a formation.

An ART that can be deployed as part of a resistivity logging tool 114 in a wellbore through a fluid-producing formation uses an electric coil to generate an alternating current loop through the fluid-producing formation by induction. The alternating current loop through the formation induces an additional current in a receiving coil located elsewhere on the ART. The amount of current flowing through the receiving coil is proportional to the current induced in the formation. Either one or both of the conductivity and resistivity of the formation can be determined from the relationship between the current through the receiver coil and the current induced in the formation.

Accordingly, in such formation evaluations, there are typically five unknowns to be determined: mud permittivity ($\varepsilon_m$), mud resistivity ($R_m$), any standoff distance for the tool (d) resulting from layers of earth such as mud or mud cake between the tool pad and the formation, formation permittivity ($\varepsilon_f$), and formation resistivity ($R_f$), at each measuring location. Determination of these values within the depths of investigation ("DOI") can provide for a profile of the formation identifying the location and density of hydrocarbons or any invasions in the DOI of the formation evaluated. In evaluating formations, it may also be useful to determine other unknown parameters, including invasion-zone resistivity ($R_{xo}$), horizontal formation resistivity ($R_h$), and vertical resistivity formation ($R_v$).

In some embodiments, when using data from an ART that is not a MCI tool, $R_m$ and $R_h$ are calculated at the shortest arrays (or $R_{xo}$ if an invasion is present). The shortest arrays for the ART can include the transmitter-receiver arrays with smallest distance between the transmitter and the receiver. The calculated values of $R_m$ and $R_h$ are used as initial values and constraint thresholds for $R_m$ and $R_f$ in HFDT processing. This use of the ART data logs and estimates can expedite the inversion solution of HFDT because optimized initial values for unknowns can accelerate the inversion convergence rate in HFDT processing. Moreover, the HFDT inversion processing becomes more rigorous, and thus more accurate, by applying additional constraints, particularly constraints based on real physical measurements.

In some embodiments, formation anisotropy and dip angles that are calculated from MCI tool data logs can be used to correct formation anisotropy and dipping effects on HFDT data logs. $R_m$ and $R_h$ are calculated at the shortest arrays (or $R_{xo}$ is calculated if an invasion is present) from a MCI tool, which in embodiments is a set of triaxial ARTs. The calculated values of $R_m$ and $R_h$ are used as initial values and constraint thresholds for $R_m$ and $R_f$ in HFDT processing. With the additional information on formation anisotropy and dip angle available from MCI tools, undesired effects including anisotropy and dipping effects can be removed or corrected from the HFDT data. Thus, in addition to accelerating the inversion convergence rate and generating more accurate results in HFDT processing, an even more accurate inversion solution can be obtained from HFDT processing using the data corrected for anisotropy and dipping effects.

Figure 3:
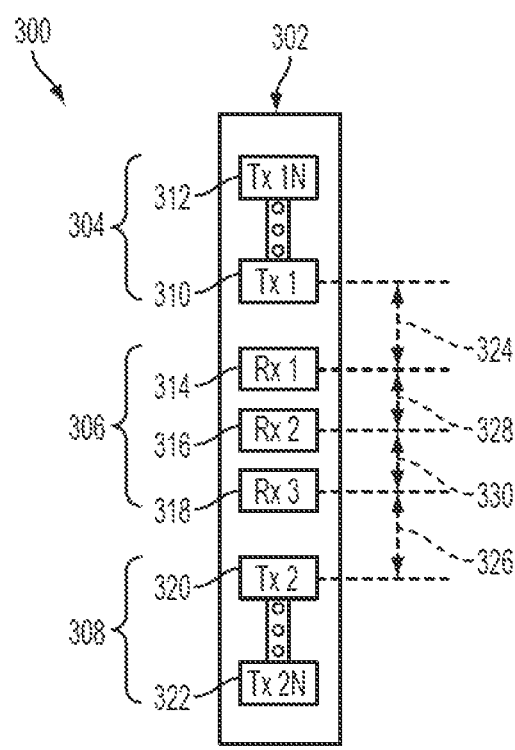
FIG. 3 is a schematic diagram of an example of an HFDT that can be deployed in a wellbore according to one aspect of the present disclosure.

An HFDT 300 as shown in FIG. 3 can include a tool facing plate 302 along the exterior of a probe inserted into a wellbore 102. In embodiments, the facing plate 302 has a primary transmitting antenna region 304, a receiving antenna region 306, and a secondary transmitting antenna region 308. In some embodiments, the HFDT sensors are capable of evaluating a DOI from about one inch to about six inches. The primary transmitting antenna region 304 is located at one end of the facing plate 302 proximate to the receiving antenna region 306 and relatively distal from the secondary transmitting antenna region 308. The primary transmitting antenna region 304 has at least a first primary transmitting antenna 310 that is configured to emit an electromagnetic signal. The primary transmitting antenna region 304 can have a plurality of transmitting antennas, ending with a terminal primary transmitting antenna 312, such that the range between the first primary transmitting antenna 310 and the terminal primary transmitting antenna 312 defines the area for the primary transmitting antenna region 304. Similarly, the secondary transmitting antenna region 308 has at least a first secondary transmitting antenna 320 which is configured to emit an electromagnetic signal. The secondary transmitting antenna region 308 can have a plurality of transmitting antennas, ending with a terminal secondary transmitting antenna 322, such that the range between the first secondary transmitting antenna 320 and the terminal secondary transmitting antenna 322 defines the area for the secondary transmitting antenna region 308. Each set of transmitting antennas are operable to transmit a current according to instructions from a controller 202.

The receiving antenna region 306 has at least three receiving antennas 314, 316, 318. The first receiving antenna 314 can be located closest to the primary transmitting antenna region 304, while the third receiving antenna 318 can be located closest to the secondary transmitting antenna region 308, with the second receiving antenna 316 located between the two other receiving antennas. The range between the first receiving antenna 314 and the third receiving antenna 318 can define the area for the receiving antenna region 306. In some embodiments, there may be more than three receiving antennas, while in other embodiments there may be less than three receiving antennas. The receiving antennas 314, 316, 318 are configured to receive signals fired from the at least the primary transmitting antennas 310, 312. The receiving antennas 314, 316, 318 can be configured to measure any suitable range of electrical signal levels within measurable ranges of amplitudes.

In an embodiment, when an HFDT is operated to emit a single frequency electromagnetic signal through two transmitters at a logging location, where three receivers are used to receive the propagated electromagnetic signals. Accordingly, six amplitudes and six phases are measured at each logging location when the primary transmitters are fired. Hence the independent equations listed below are related to the signals from the primary transmitting antenna region 304.

$$\begin{cases} F^*_{R1-T1} = G^*_{11}(d, \varepsilon_m, \sigma_m, \varepsilon_1, \sigma_1) & (1\text{-}1) \\ F^*_{R2-T1} = G^*_{12}(d, \varepsilon_m, \sigma_m, \varepsilon_1, \sigma_1) & (1\text{-}2) \\ F^*_{R3-T1} = G^*_{13}(d, \varepsilon_m, \sigma_m, \varepsilon_1, \sigma_1) & (1\text{-}3) \\ DF^*_{R1-R2} = G^*_{12}(d, \varepsilon_m, \sigma_m, \varepsilon_1, \sigma_1)/G^*_{11}(d, \varepsilon_m, \sigma_m, \varepsilon_1, \sigma_1) & (1\text{-}4) \\ DF^*_{R2-R3} = G^*_{13}(d, \varepsilon_m, \sigma_m, \varepsilon_1, \sigma_1)/G^*_{12}(d, \varepsilon_m, \sigma_m, \varepsilon_1, \sigma_1) & (1\text{-}5) \\ DF^*_{R1-R3} = G^*_{13}(d, \varepsilon_m, \sigma_m, \varepsilon_1, \sigma_1)/G^*_{11}(d, \varepsilon_m, \sigma_m, \varepsilon_1, \sigma_1) & (1\text{-}6) \end{cases}$$

In the above set of equations, $F^*_{Ri-T1}$ are the measured complex-valued signals by a receiver antenna, with the three receiving antennas of the embodiment indicated as "i" (i=1, 2, and 3), while the primary transmitting antennas are fired. Further, $G^*_{1i}$ are complex-valued propagation functions, from the primary transmitter region to the receiving antennas i (i=1, 2, 3), through the formation. The values $DF^*_{Ri-Rj}$ are the complex signal ratios of Receiver j over Receiver i, i.e. between the last and first receiving antennas. The complex equations (1-1) to (1-6) include twelve (12) scalar equations. In this set of equations, the five unknown formation parameters to be solved are over-determined (i.e. there are more equations than unknowns) and can be solved numerically. In the absence of an analytical inversion model, an algorithmic inversion is employed to obtain the formation parameters from the measured signal amplitudes and phases.

With regard to the secondary transmitting antenna region 308, another six amplitudes and six phases will also be measured when the secondary transmitting antennas are fired. However, these signals are generally used for system measurement error compensation and are not typically used to generate independent equations for inversion algorithm calculations due to the symmetric distribution of the two transmitting antennas. Alternative embodiments may account for this physical symmetric distribution such that the secondary transmitting antennas are used to generate further resistivity data.

Figure 4:
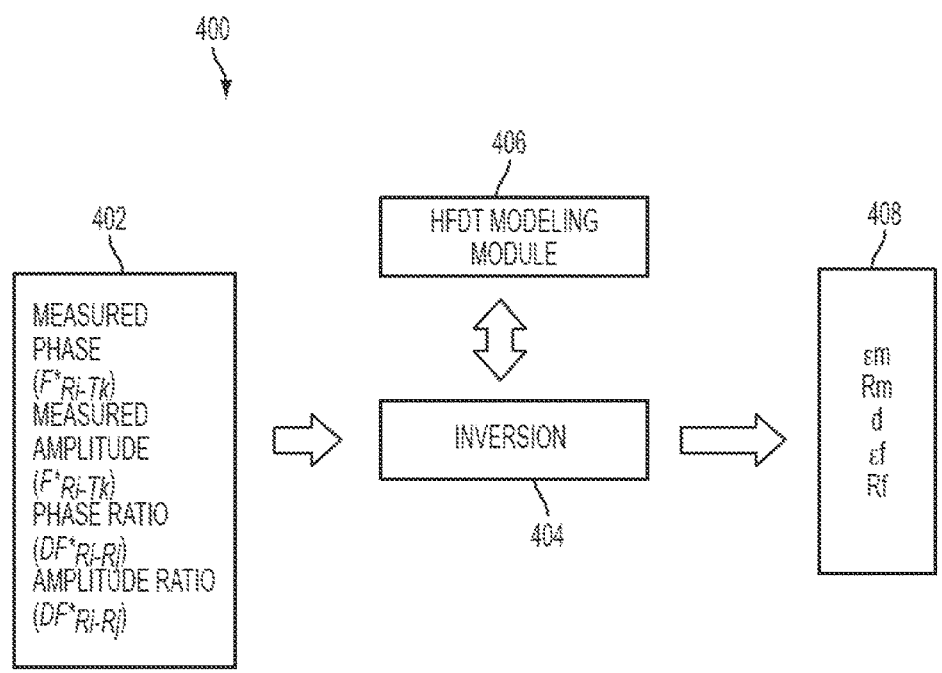
FIG. 4 is a flowchart depicting an example of data processing for data acquired by an HFDT according to one aspect of the present disclosure.

FIG. 4 is a flowchart of an example of a process for processing data acquired by a HFDT 300 as described above in relation to FIG. 3. The data acquisition 402 includes the measured phase and measured amplitude between the signal transmitted and signal received by the HFDT and the ratio of phases measured and ratio of amplitudes measured by the receivers of the HFDT. The data acquisition 402 values are sent to an inversion processing module 404 which performs the calculations as set forth in complex equations (1-1) to (1-6) described above. The inversion processing module 404 processes the data received, and can further exchange the proceeded data with an HFDT modeling module 406 in order to calculate or develop values to be used in the complex inversion equations. The inversion processing module 404 produces a data set 408 of the desired measured parameters of mud permittivity ($\varepsilon_m$), mud resistivity ($R_m$), standoff distance from the tool (d), formation permittivity ($\varepsilon_f$), and formation resistivity ($R_f$). In some embodiments, multiple iterations can be performed by the inversion processing module 404 to obtain the data set 408.

Data from acquired from a MCI tool can be processed to determine or otherwise estimate mud resistivity ($R_m$), invasion-zone resistivity ($R_{xo}$), horizontal formation resistivity at ith array $R_{h(i)}$, vertical resistivity formation at ith array $R_{v(i)}$, and formation relative dip. Dip refers to the angle between a planar feature in the formation, such as a sedimentary bed or a fault, and a horizontal plane.

Figure 5A:
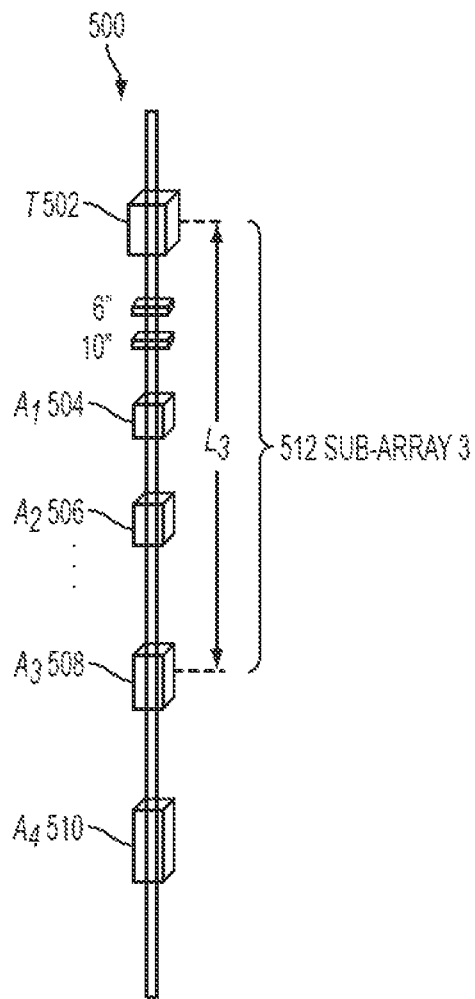
FIG. 5A is a schematic diagram of an example of a multi-component induction (MCI) tool that can be deployed in a wellbore according to one aspect of the present disclosure.
Figure 5B:
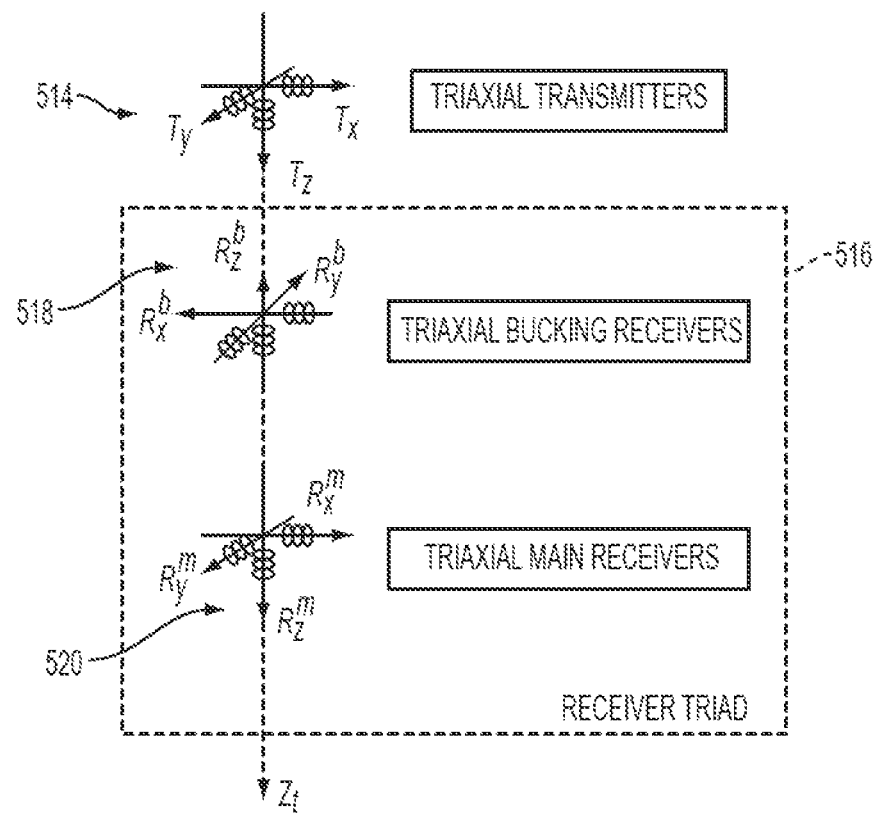
FIG. 5B is a schematic diagram, further detailing the transmitters and receivers that can be used in an MCI tool that can be deployed in a wellbore according to one aspect of the present disclosure.

A MCI tool 500 according to some embodiments can include triaxial tool structure, as depicted in FIGS. 5A and 5B. The ART 500 illustrates the response of one ART subarray at one frequency. In embodiments, the ART can have a DOI of from about ten inches to about ninety inches, dependent on the spacing of the transmission and receiving arrays.

As depicted in FIG. 5A, the MCI tool 500 can include three mutually orthogonal transmitters 502, at least two sets of three mutually orthogonal main receivers, and at least two sets of three mutually orthogonal bucking/balancing receivers. A set of main receivers and set of bucking/balancing receivers can function as a receiver triad. In some embodiments, the MCI tool further includes a first receiver triad 504, a second receiver triad 506, a third receiver triad 508 and a fourth receiver triad 510. The communication between the transmitters 502 and a receiver triad can be defined as a subarrary. A subarray 512 is shown as the communication between the transmitters 502 and the third receiver triad 508. Additional subarrays can also exist between the transmitters 502 and the other receiver triads of the MCI tool.

Each of the mutually orthogonal transmitters 502 and receiver triads 504, 506, 508, 510 include induction coils. This configuration (as illustrated in FIG. 5B) enables the measurement of a nine-component voltage per frequency per triad in the logging tool's three-dimensional (3D) coordinate system at each logging depth.

FIG. 5B is a schematic diagram, further detailing transmitters and receivers that can be used in an exemplary MCI tool sensor, where the transmitters and receivers are all triaxial components. In the triaxial transmitter 514, the three mutually orthogonal transmitters ($T_x$, $T_y$, $T_z$) operate to induce a signal through a formation in the respective orthogonal directions. A receiver triad 516 includes a set of main receivers 520 and a set of bucking receivers 518. The three mutually orthogonal main receivers 520 ($R_{xm}$, $R_{ym}$, $R_{zm}$) are operative to receive the signals initiated by the triaxial transmitter 514 and provide the measurement signal to use as the basis for formation evaluation calculations. The three mutually orthogonal bucking receivers 518 ($R_{xb}$, $R_{yb}$, $R_{zb}$) are operative to also receive the signals initiated by the triaxial transmitter 514, and to provide for either or both of balancing and error correction to the signals as recorded by the main receivers 520. In embodiments, a plurality of receiver triads 516 can be used in combination with a triaxial transmitter 514 to generate array induction formation data.

The MCI tool measures nine component voltages that can be expressed as a three-by-three tensor given such as:

$$\overline{V} = (V_{ij})_{(3\times 3)} = \begin{pmatrix} V_{xx} & V_{xy} & V_{xz} \\ V_{yx} & V_{yy} & V_{yz} \\ V_{zx} & V_{zy} & V_{zz} \end{pmatrix}, i, j = x, y, z \quad (2)$$

in which $V_{ij}$ is the measured-voltage coupling. The first subscript "i" indicates the transmitter direction and the second subscript "j" indicates the receiver direction.

In the induction logging, the voltages values measured in the receivers coil, expressed in Equation (2), can be converted into apparent conductivity values to obtain the following apparent-conductivity tensor expression:

$$\overline{\sigma_a} = (\sigma_{ij})_{(3\times 3)} = \begin{pmatrix} \sigma_{xx} & \sigma_{xy} & \sigma_{xz} \\ \sigma_{yx} & \sigma_{yy} & \sigma_{yz} \\ \sigma_{zx} & \sigma_{zy} & \sigma_{zz} \end{pmatrix}, i, j = x, y, z \quad (3)$$

Here, $\overline{\sigma_a}$ is the apparent-conductivity tensor in the MCI tool or measurement coordinate system ($x_t$, $y_t$, $x_t$) and $\sigma_{ij} = V_{ij}/KV_{ij}$, where the conversion factor $KV_{ij}$ is used to convert a voltage value $V_{ij}$ into a corresponding conductivity value $\sigma_{ij}$. The conversion factors can be determined via experimentation or any other suitable process. Moreover, in embodiments the MCI tool sensor can be approximated as a point dipole-type, and accordingly the calibration factors can be set as $K_{xx}^V = K_{yy}^V = K_{xy}^V = K_{yx}^V$ and $K_{xz}^V = K_{yz}^V = K_{zx}^V = K_{zy}^V$. Therefore, there should only be three independent calibration factors in such embodiments: $K_{zz}^V$, $K_{xx}^V$, and $K_{xz}^V$ for one subarray operated at one frequency. Here, if i, j=z, then the coupling $\sigma_{ij}$ is the conventional induction measurement (or it is denoted as ZZ).

In contrast to a MCI tool model, an ART tool only includes z-directional transmitters ($T_z$), z-directional main receivers ($R_{zm}$) and z-directional bucking/balancing receivers ($R_{zb}$). Thus, measured voltages from a non-multi-component array induction tool may be sensitive to horizontal formation resistivity, due to the orientation and configuration of the induction coils. Therefore, a non-multi-component ART can only produce estimation of mud resistivity ($R_m$), invasion resistivity ($R_{xo}$), and horizontal formation resistivity at ith array $R_{h(i)}$ after data processing.

Figure 6A:
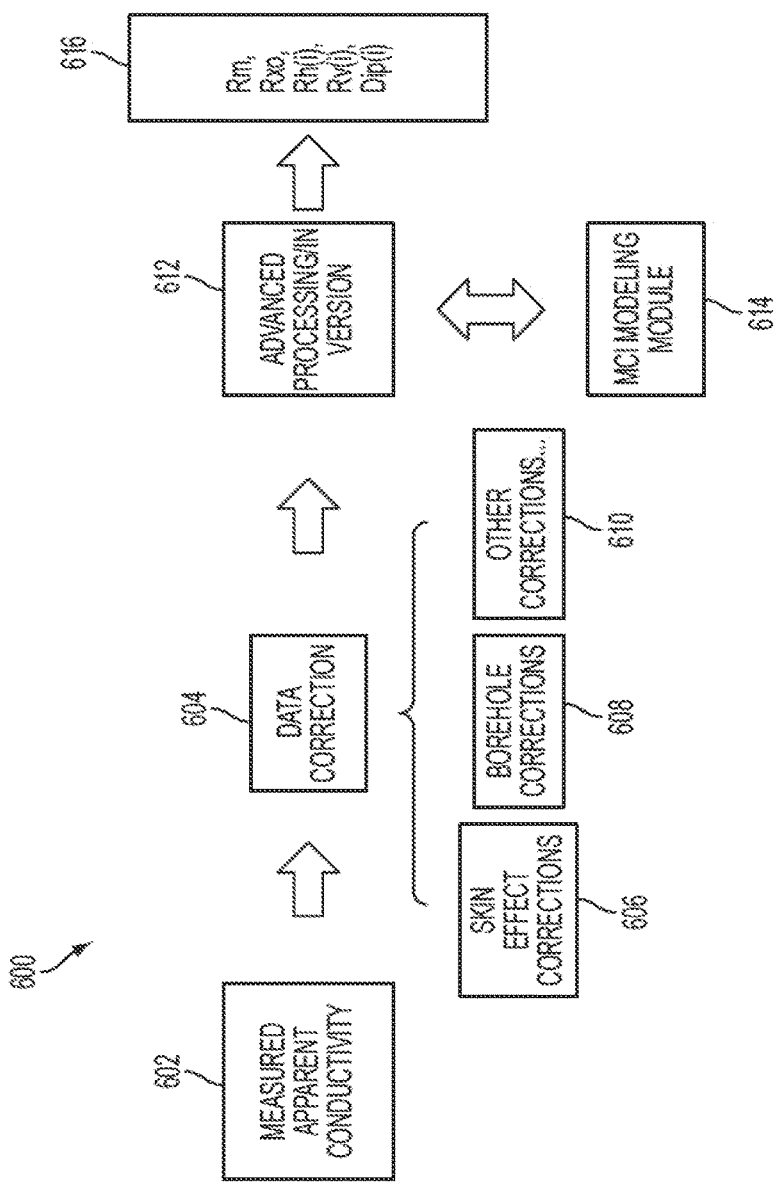
FIG. 6A is a flowchart depicting an example of data processing for data acquired by a MCI tool according to one aspect of the present disclosure.
Figure 6B:
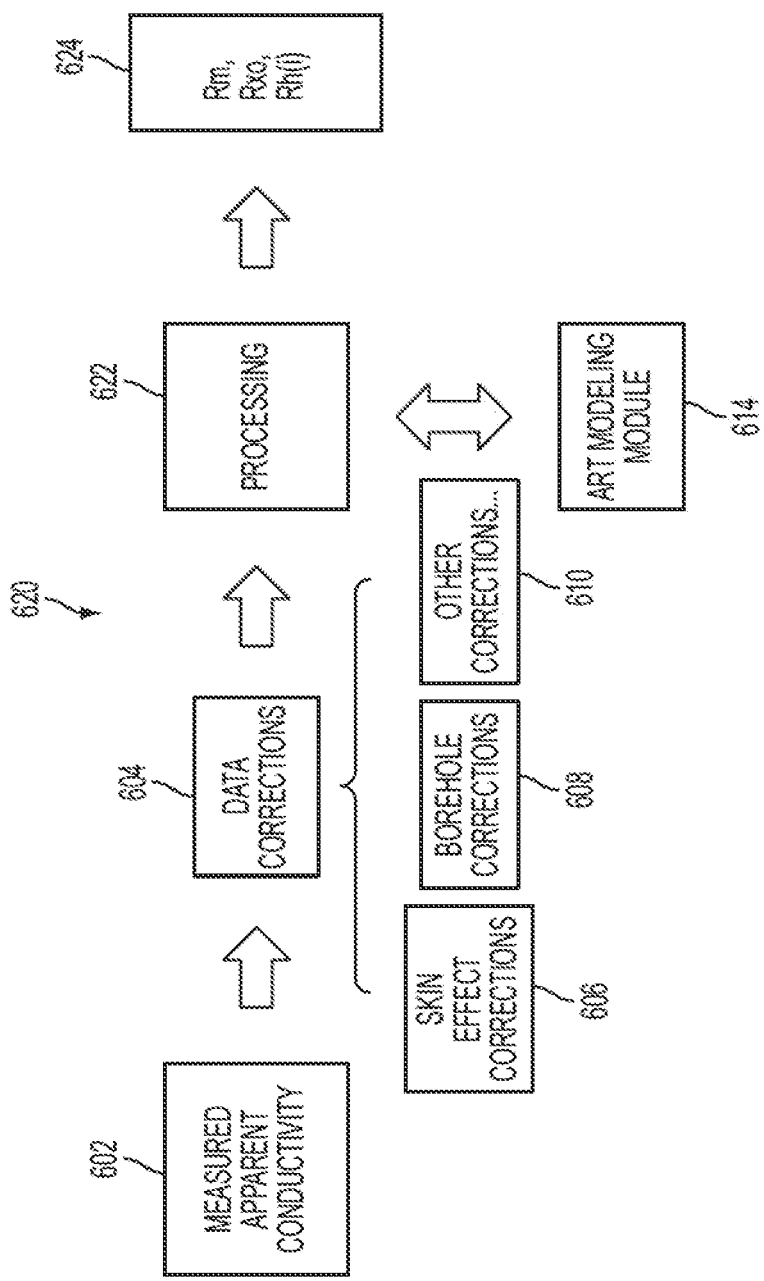
FIG. 6B is a flowchart depicting an example of data processing for data acquired by an ART according to one aspect of the present disclosure.

Associated processing flowcharts for an MCI tool and an ART are illustrated in FIG. 6A and FIG. 6B, respectively. As shown in FIG. 6A for a MCI tool, the data processing 600 begins with measured apparent conductivity 602 received from the receivers being sent to a data correction processing module 604. The data correction processing module 604 may implement one or more algorithms to ensure that the measured apparent conductivity 602 data is accurate. Such data corrections can be processed to implement skin effect corrections 606, borehole corrections 608, or other corrections 610 as known and used in the industry. The output of the data correction processing module 604 can be processed by advanced processing and inversion algorithms. The advanced processing and inversion processing module 612 processes such data received from data correction processing module 604, and can further exchange the proceeded data with an ART modeling module processor 614. The advanced processing and inversion processing module 612 produces a data set 616 of the desired measured parameters of mud permittivity ($\varepsilon_m$), invasion resistivity ($R_{xo}$), horizontal formation resistivity ($R_{h(i)}$), vertical formation resistivity ($R_{v(i)}$), and formation relative dip (Dip). In aspects, both the data correction processing module 604 and the processing and inversion processing module 612 can include executable code stored in the memory 210 that can be executed by the processing unit 208.

As shown in FIG. 6B for a (non-multi-component) ART, the data processing 620 is similar, but having a different scope in terms of the data output. Measured apparent conductivity 602 is received from the receivers and sent to a data correction processing module 604. The data correction processing module 604 may implement one or more algorithms to ensure that the measured apparent conductivity 602 data is accurate. Such data corrections can be processed to implement skin effect corrections 606, borehole corrections 608, or other corrections 610 as known and used in the industry. The skin effect corrections 606 are applied to remove frequency-dependent effects in ART responses. The borehole corrections 608 are applied to remove logging borehole effects (i.e. effects based on borehole size, borehole fluid, and tool eccentricity) on ART responses. Once the data correction processing module 604 applies corrections to the acquired data, the corrected data is subjected to processing module 622 algorithms. This processing module 622 can contain advanced processing steps, including radial direction focusing, vertical resolution matching, and invasion calculation. The processing module 622 processes the data received, and can further exchange the proceeded data with an ART modeling module processor 614. The processing module 622 produces a data set 624 of the desired measured parameters of mud permittivity ($\varepsilon_m$), invasion resistivity ($R_{xo}$), and horizontal formation resistivity ($R_{h(i)}$). In aspects, both the data correction processing module 604 and the processing and processing module 622 can include executable code stored in the memory 210 that can be executed by the processing unit 208.

In some embodiments, the processing of HFDT data is enhanced by combining the HFDT data processing with ART data. Such embodiments improve downhole processing of high-frequency dielectric tool data whenever array induction log data is available. Because some common formation parameters can be estimated from ART processing, these values can be applied as initial values and constraint thresholds in the HFDT processing, thereby allowing the HFDT processing to accelerate and stabilize its inversion process. Constraint thresholds applied by a processing algorithm can be determined from, or based on, given initial values. For examiner, given $R_0$ as one initial value of formation resistivity, a correlated constraint condition can be enforced when estimating the formation resistivity. One example of such a constraint condition is that the absolute value of the difference between a measured resistivity and the initial value for resistivity is less than or equal to a specified threshold value appropriate to the estimate ($|R-R_0|\leq$threshold). Another example of such a constraint condition is that the absolute value of the difference between a measured resistivity and the initial value for resistivity, divided by the initial vale for the resistivity, must be less than or equal to a specified threshold value appropriate to the estimate ($|R-R_0|/|R_0|\leq$threshold). These constraint thresholds can be applied as additional terms in the objective cost function of the inversion process.

The objective cost function of the inversion process is usually defined as:

$$C(X) = \frac{1}{2}[\|e(X)\|^2], \quad (4)$$

where the residual vector is defined as:

$$e(X) = \begin{bmatrix} S_1(X) - m_1 \\ S_2(X) - m_2 \\ \vdots \\ S_j(X) - m_j \\ \vdots \\ S_M(X) - m_M \end{bmatrix} \quad (5)$$

where $S_j(X)$ is the modeled tool response corresponding to a particular value of parameter vector X, where $m_j$ is the corresponding measured data, and where $\|.\|^2$ refers to the L2-norm (i.e. the vector norm as defined for a complex vector).

In such cost function calculations, $X_j$ is a parameter which a constraint threshold $X_{ref}$ needs to be applied. Thus, the modified objective cost function is expressed as the following:

$$C(X) = \frac{1}{2}[\|e(X)\|^2] + \frac{\beta}{2}[\|X_j - X_{ref}\|^2] \quad (6)$$

where $\beta$ is a selected weighting factor.

If a non-multi-component array induction tool is used and the ART log data indicates that an invasion is absent, calculations for $R_m$ and $R_h$ are made from shortest-array processing, and are subsequently applied as the initial values and constraint thresholds for $R_m$ and $R_f$ in the HFDT processing. If the ART log data indicates that an invasion is present, $R_{xo}$ is calculated from the ART is used as the initial value and constraint threshold for $R_f$ in the HFDT processing. The modified objective cost function can be expressed as:

$$C(X) = \frac{1}{2}[\|e(X)\|^2] + \quad (7a)$$
$$\frac{\beta_f}{2}[\|R_f - R_h^{ArrayInduction}\|^2] + \frac{\beta_m}{2}[\|R_m - R_m^{ArrayInduction}\|^2]$$

or $$C(X) = \frac{1}{2}[\|e(X)\|^2] + \quad (7b)$$
$$\frac{\beta_f}{2}[\|R_f - R_{xo}^{ArrayInduction}\|^2] + \frac{\beta_m}{2}[\|R_m - R_m^{ArrayInduction}\|^2].$$

Figure 7:
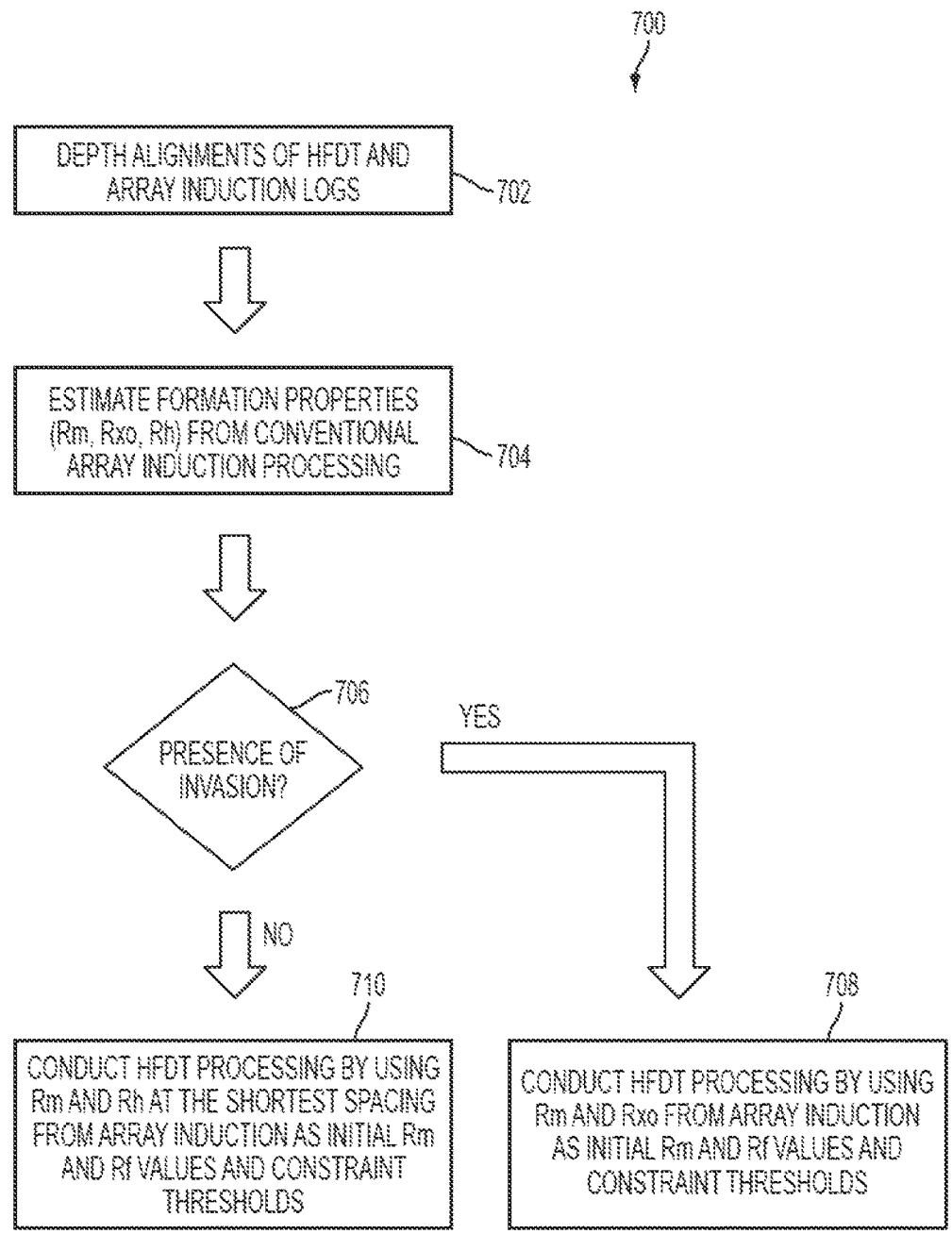
FIG. 7 is a flowchart depicting an example of a process for processing data acquired by both a HFDT and an ART according to one aspect of the present disclosure.

FIG. 7 is a flow chart depicting an example process 700 for processing data acquired from both a HFDT and a non-multi-component ART.

At block 702, a depth alignment process is performed on the data received from the HFDT and the ART logs to help ensure that the compared HFDT logs and the ART logs do in fact refer to the same location of investigation in the formation. For example, the processing unit 208 can perform a depth alignment process to ensure that different types of logs refer to the same logging depth and location within the same well.

At block 704, an estimate of formation properties $R_m$, $R_{xo}$, and $R_h$ is made based on the data logs from the ART. For example, the processing unit 208 can determine estimated values for the formation properties $R_m$, $R_{xo}$, and $R_h$ based on the data logs from the ART, those data logs having been aligned by the process in block 702.

At block 706, a determination is made based on the ART data logs as to whether or not an invasion is present in the formation at the DOI and location evaluated by the ART. For example, the processing unit 208 can determine whether the ART data logs indicate the presence of an invasion.

If an invasion is determined to be present, HFDT processing is conducted using the $R_m$ and $R_{xo}$ values from the ART as the initial $R_m$ and $R_f$, respectively, values and constraint thresholds for the HFDT analysis, as depicted in block 708. For example, the processing unit 208 can perform HFDT processing that applies the modified objective cost function as given in Equation (7b) in response to the ART data indicating the presence of an invasion.

If an invasion is determined to be absent, HFDT processing is conducted using the $R_m$ and $R_h$ values at the shortest spacing from the ART as the initial $R_m$ and $R_f$, respectively, values and constraint thresholds for the HFDT analysis, as depicted in block 710. For example, the processing unit 208 can perform HFDT processing that applies the modified objective cost function as given in Equation (7a) in response to the ART data indicating the absence of an invasion. The data logs as processed according to HFDT analysis in either blocks 708 or 710 can be outputted for further display, analysis, manipulation, or combinations thereof.

If a MCI tool is available, which can further be a triaxial tool, further improvements on HFDT processing can be conducted. In HFDT processing where ART data is applied, the formation model is assumed to be isotropic and that the wellbore is vertical. In field logging, these assumptions may be inaccurate or may fail and introduce noticeable effects such as anisotropic and dipping effects. These effects can be corrected or removed if the formation anisotropy and dipping information are known from the MCI tool logging.

In some embodiments, data from a multi-component ART can be applied to correct HFDT data. Specifically, a $HFDT_{Library}$ can be a pre-calculated look-up table, which is a function of Rm, Rh, Dip, and Rv. In such cases, $HFDT_{Library}^{Rm,Rh,Dip=0,Rv=Rh}$ corresponds to cases where anisotropic and dipping effects are nonexistent, while $HFDT_{Library}^{Rm,Rh,Dip,Rv}$ represents cases with anisotropic and dipping effects. The application of the correction is given by applying one or both of the following equations, as appropriate:

$$Data^{corrected} = Data^{raw} - (HFDT_{Library}^{Rm,Rh,Dip,Rv} - HFDT_{Library}^{Rm,Rh,Dip=0,Rv=Rh}) \quad (8a)$$

Or $$Data^{corrected} = Data^{raw} * (HFDT_{Library}^{Rm,Rh,Dip=0,Rv=Rh} / HFDT_{Library}^{Rm,Rh,Dip,Rv}) \quad (8b)$$

More particularly, the look-up table is a collection of stored HFDT responses calculated from a series of numerically forward simulations. For each forward simulation, different variables (Rm, Rh, Dip, and Rv) are used to calculate HFDT responses. In other words, the look-up table is a collection of computed HFDT responses with respect to different variables. Once MCI tool data is available, the look-up table can be used to quickly estimate the HFDT responses $HFDT_{Library}^{Rm,Rh,0,Rv=Rh}$ and $HFDT_{Library}^{Rm,Rh,Dip,Rv}$, where the variables Dip and Rv are computed from the MCI tool. Anisotropy and dipping corrections on HFDT are conducted simultaneously using either (8a) or (8b), as appropriate to the input data. As evident in the equations above, equation (8a) uses an absolute difference between the responses to correct HFDT data, while equation (8b) relies on a ratio difference between the responses to correct HFDT data.

Figure 8:
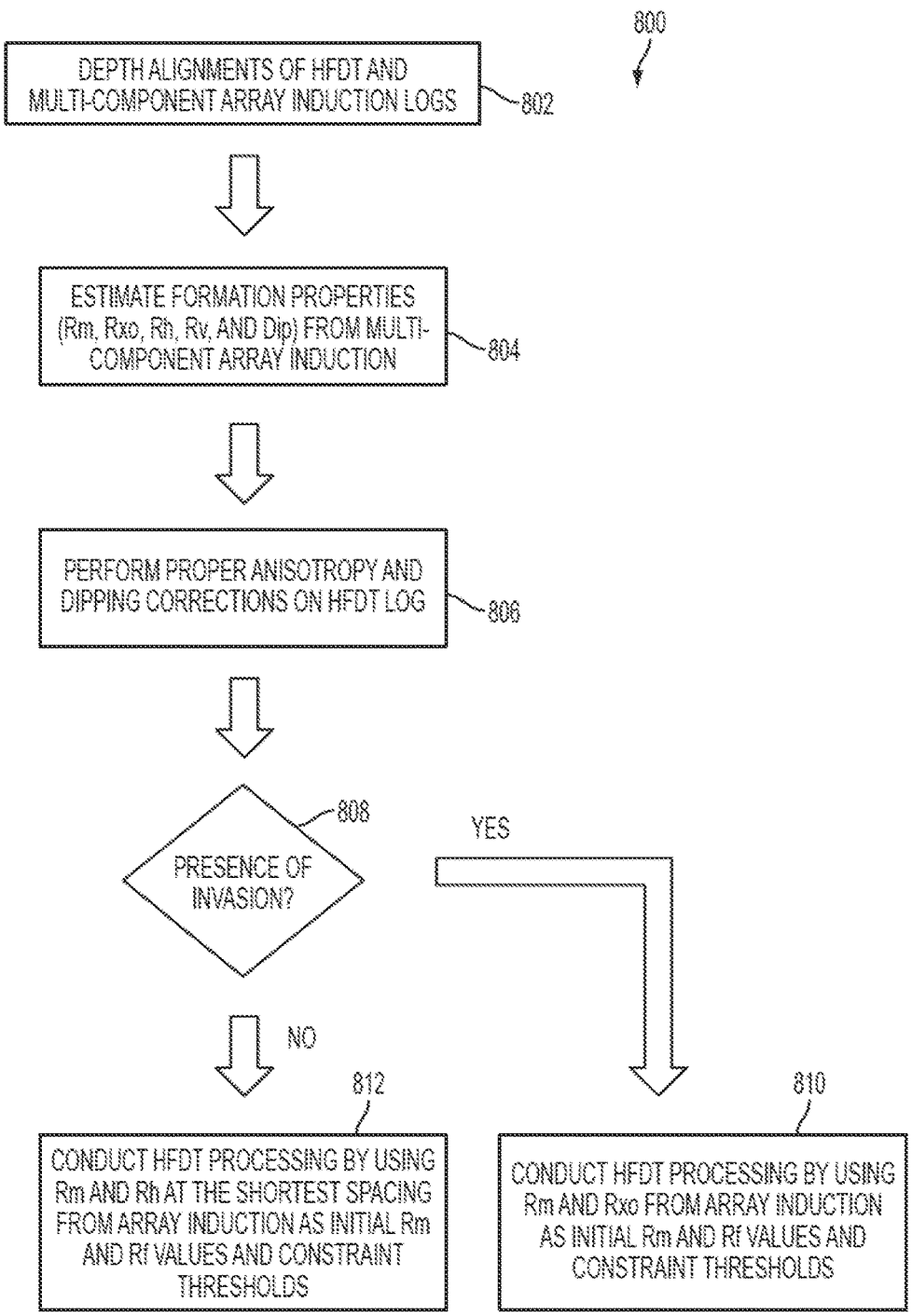
FIG. 8 is a flowchart depicting an example of a process for processing data acquired by both a HFDT and a MCI tool according to one aspect of the present disclosure.

FIG. 8 is a flow chart depicting an example process 800 for processing data acquired from both a HFDT and a MCI tool. As with non-multi-component ART, similar objective cost functions can be derived for MCI tool, as seen in Equations (7a) and (7b).

At block 802, a depth alignment process can be performed on the data received from the HFDT and the ART logs to help ensure that the compared HFDT logs and the ART logs do in fact refer to the same location of investigation in the formation. For example, the processing unit 208 can be a depth alignment process.

At block 804, an estimate of formation properties $R_m$, $R_{xo}$, $R_h$, $R_v$ and Dip is determined based on the data logs from the MCI tool. For example, the processing unit 208 can determine estimates of the formation properties $R_m$, $R_{xo}$, $R_h$, $R_v$ and Dip.

At block 806, anisotropy and dipping corrections are applied to the HFDT log data, according to one or both of Equations (8a) and (8b), as appropriate, generating corrected HFDT log data. For example, the processing unit 208 can apply the anisotropy and dipping corrections.

At block 808, based on the ART data logs, a determination is made as to whether or not an invasion is present in the formation at the DOI and location evaluated by the ART. For example, the processing unit 208 can determine whether the ART data indicates the presence of an invasion.

If an invasion is determined to be present, HFDT processing is conducted (with the corrected HFDT log data) using the $R_m$ and $R_{xo}$ values from the ART as the initial $R_m$ and $R_f$, respectively, values and constraint thresholds for the HFDT analysis, as depicted in block 810. For example, the processing unit 208 can perform HFDT processing that applies a modified objective cost function similar to Equation (7b) in response to the ART data indicating the presence of an invasion.

If an invasion is determined to not be present, HFDT processing is conducted using the $R_m$ and $R_h$ values at the shortest spacing from the ART as the initial $R_m$ and $R_f$, respectively, values and constraint thresholds for the HFDT analysis, as depicted in block 812. For example, the processing unit 208 can perform HFDT processing that applies a modified objective cost function similar to Equation (7a) in response to the ART data indicating the absence of an invasion. The data logs as processed according to HFDT analysis in block 810 or block 812 can be outputted for further display, analysis, manipulation, or combinations thereof.

In some embodiments, to further improve HFDT processing results, an iterative updating scheme can be applied to the processing operations as seen in the flowcharts shown in FIG. 7 and FIG. 8. For instance, after HFDT processing is performed, the results from the overall processing can be used as input values for array induction processing. Accordingly, subsequent iterations of the formation evaluation processes depicted in FIGS. 7 and 8 can be performed with more accurate input data.

Figure 9:
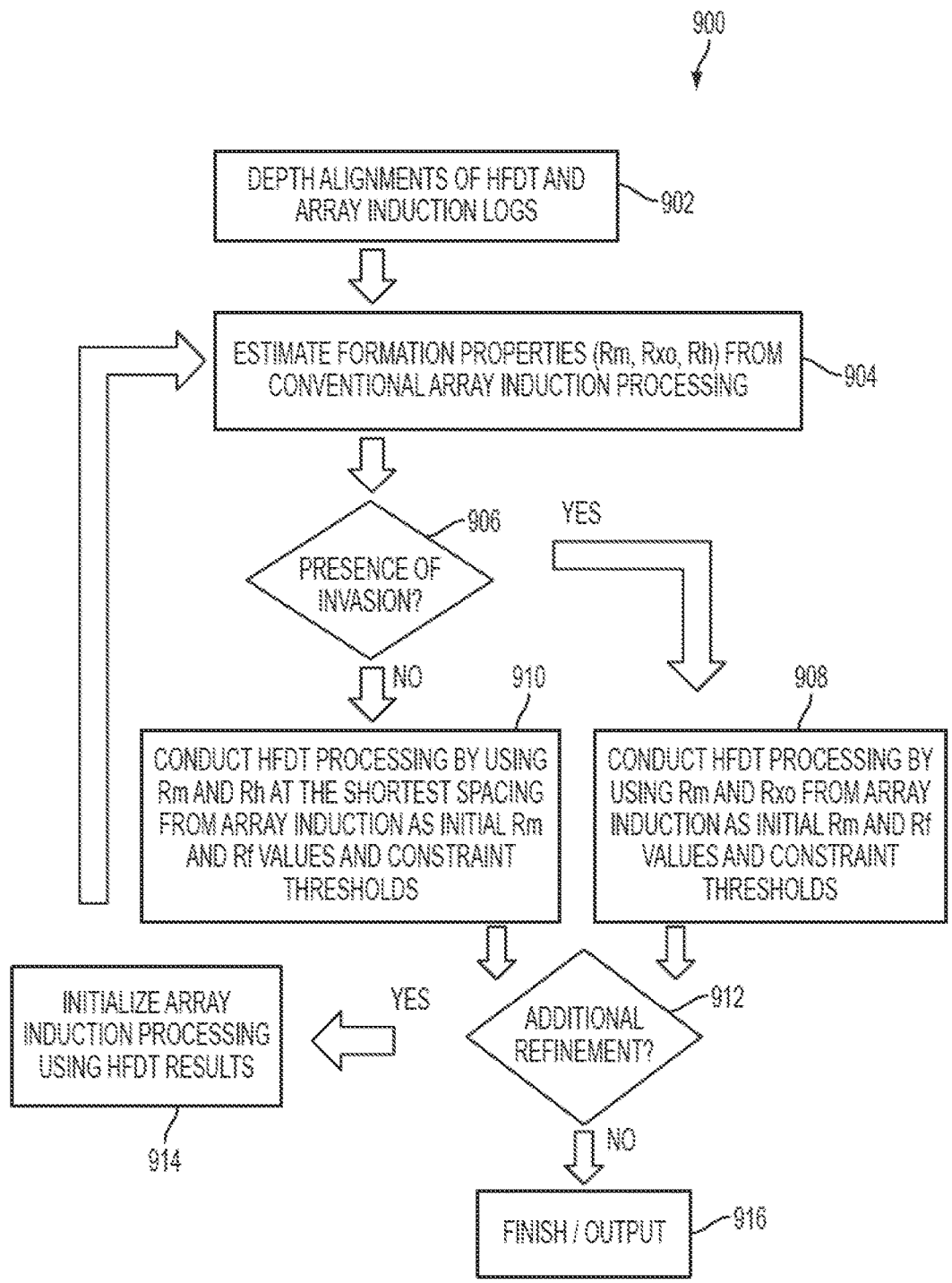
FIG. 9 is a flowchart depicting an example of a process for iteratively processing data acquired by both a HFDT and an ART according to one aspect of the present disclosure.
Figure 10:
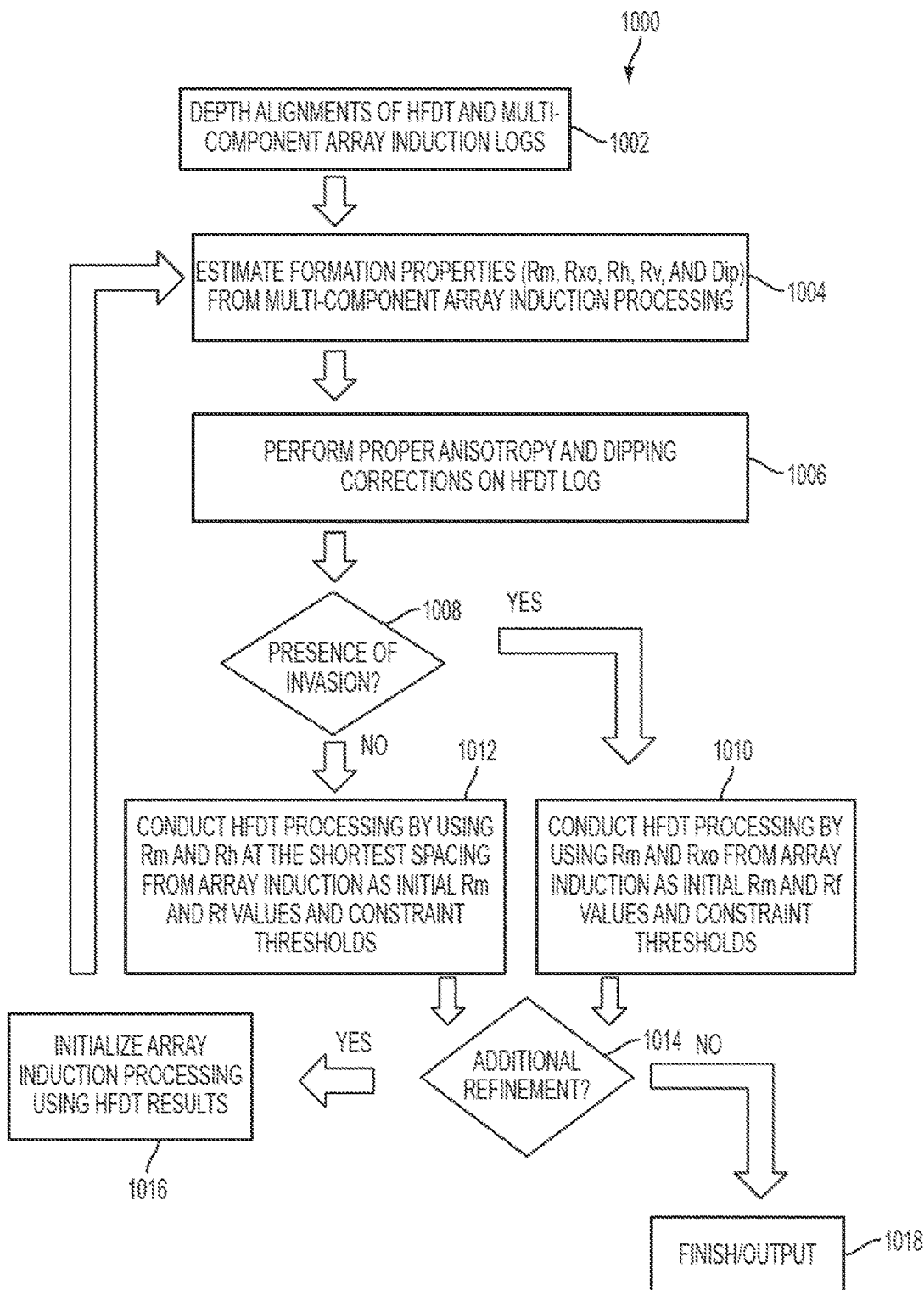
FIG. 10 is a flowchart depicting an example of a process for iteratively processing data acquired by both a HFDT and a MCI tool according to one aspect of the present disclosure.

Examples of such iterative processes are depicted as FIG. 9 and FIG. 10.

FIG. 9 is a block diagram of an example of a process 900 for iteratively processing data acquired by both a HFDT and a non-multi-component ART.

At block 902, a depth alignment process can be applied to the data received from the HFDT and the ART logs.

At block 904, an estimate of formation properties $R_m$, $R_{xo}$, and $R_h$ can be made based on the data logs from the ART.

At block 906 a determination is made based on ART data logs as to whether an invasion is present in the formation at the DOI and location evaluated by the ART.

If an invasion is determined to be present, then HFDT processing is conducted using the $R_m$ and $R_{xo}$ values from the ART as the initial $R_m$ and $R_f$ respectively, values and constraint thresholds for the HFDT, as depicted in block 908. The HFDT processing applies the modified objective cost function as given in Equation (7b) in response to the ART data indicating the presence of an invasion.

If an invasion is determined to be absent, then HFDT processing is conducted using the $R_m$ and $R_h$ values at the shortest spacing from the ART as the initial $R_m$ and $R_f$ respectively, values and constraint thresholds for the HFDT analysis, as depicted in block 910. The HFDT processing applies the modified objective cost function as given in Equation (7a) in response to the ART data indicating the absence of an invasion.

At block 912, a processing module of system determines if additional refinement of the data is needed. The determination of whether additional data refinement is needed can be based upon the number of previous refinements (if any) applied to the data, variance between the original ART logs and HFDT logs, a preset requirement for processing, error confidence calculations, or other analysis of the formation evaluation data.

If the system determines that further data refinement is to be performed, the initial ART processing parameters are updated, using the processed HFDT data log results, as depicted at block 914. The process 900 returns to block 904, repeating the estimate of formation properties $R_m$, $R_{xo}$, and $R_h$ and further analysis.

If the system determines that additional refinement of the data is not to be performed, the analyzed data can be outputted for further display, analysis, manipulation, or combinations thereof, as depicted at block 916.

FIG. 10 is a flowchart depicting an example of a process 1000 for iteratively processing data acquired by both a HFDT and a MCI tool according to one aspect of the present disclosure. As with non-multi-component ART, similar objective cost functions can be derived for MCI tool, as seen in Equations (7a) and (7b).

At block 1002, the data received from the HFDT and the ART logs are run though a depth alignment to help ensure that the compared HFDT logs and the ART logs do in fact refer to the same location of investigation in the formation.

At block 1004, an estimate of formation properties $R_m$, $R_{xo}$, $R_h$, $R_v$ and Dip is made based on the data logs from the multi-component ART.

At block 1006, anisotropy and dipping corrections are applied to the HFDT log data, according to one or both of Equations (8a) or (8b) as appropriate, generating corrected HFDT log data.

At block 1008, based on the ART data logs, a determination is made as to whether or not an invasion is present in the formation at the DOI and location evaluated by the ART.

If an invasion is determined to be present, then HFDT processing is conducted (with the corrected HFDT log data) using the $R_m$ and $R_{xo}$ values from the ART as the initial $R_m$ and $R_f$ respectively, values and constraint thresholds for the HFDT analysis, as depicted in block 1010. The HFDT processing applies a modified objective cost function similar to Equation (7b) in response to the ART data indicating the presence of an invasion.

If an invasion is determined to be absent, then HFDT processing is conducted using the $R_m$ and $R_h$ values at the shortest spacing from the ART as the initial $R_m$ and $R_f$ respectively, values and constraint thresholds for the HFDT analysis, as depicted in block 1012. The HFDT processing applies a modified objective cost function similar to Equation (7a) in response to the ART data indicating the absence of an invasion.

At block 1014, the data logs as processed according to HFDT analysis in either block 1010 or block 1012 are used to determine if additional refinement of the data is needed. The determination of whether additional data refinement is needed can be based upon the number of previous refinements (if any) applied to the data, variance between the original ART logs and HFDT logs, a preset requirement for processing, error confidence calculations, or other analysis of the formation evaluation data.

If the system determines that further data refinement is required, the initial ART parameters are updated using the processed HFDT data log results, as depicted at block 1016. The processing 1000 returns to block 1004 and repeats the processing as set forth in blocks 1006, 1008, and 1010 or 1012.

If the system determines that additional refinement of the data is not needed, then at block 1018 the refined analyzed data is output for further display, analysis, manipulation, or combinations thereof.

It is appreciated that the iterative processing depicted in FIGS. 9-10 may be relatively more complex than the embodiments depicted in FIGS. 7-8. For example, the processes depicted in FIGS. 9-10 may involve more time to conduct the formation evaluation or more error-checking analysis to mitigate against any numerical or computational problems resulting from the relatively more complex mathematical calculations. Application of a processing scheme as represented and discussed in relation to FIGS. 7 and 8 may be more useful for a relatively quick or real-time analysis, where the formation evaluation is relatively more directed to a qualitative result. Application of a processing scheme as represented and discussed in relation to FIGS. 9 and 10 may be more useful for operations where processing power is abundant, time is not as critical a factor, and the formation evaluation is relatively more directed toward quantitative accuracy and precision.

Figure 11:
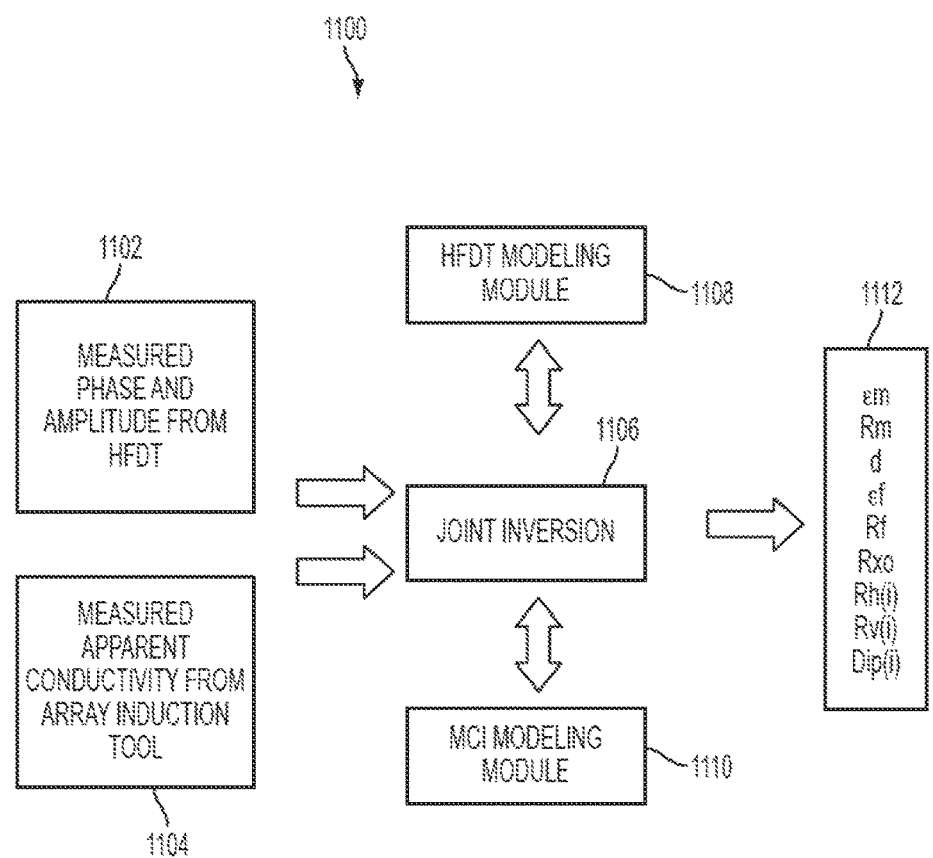
FIG. 11 is a flowchart, having a joint inversion process, depicting an example for processing data acquired by both a HFDT and a MCI tool according to one aspect of the present disclosure.

In a further alternative embodiment, FIG. 11 is a block diagram of an example data processing flowchart 1100 where the combination and analysis of HFDT data with ART data is conducted by a joint inversion processing unit, and where the inversion analysis of both the HFDT data and ART data can thus be processed concurrently. As shown in FIG. 11, both HFDT data logs 1102 and ART data logs 1104 are provided as input data into the joint inversion processing module 1106. From the joint inversion processing module 1106, the HFDT data logs 1102 are sent to an HFDT modeling module 1108 and the ART data logs 1104 are sent to the ART modeling module 1110. The values received from the HFDT modeling module 1108 and ART modeling module 1110 are used by the joint inversion processing module 1106 to calculate or generate the desired formation evaluation values of $\varepsilon_m$, $R_m$, d, $\varepsilon_f$, $R_f$, $R_{xo}$, $R_h$, $R_v$, and Dip. In embodiments, the appropriate data logs may be iteratively sent to one or both of the HFDT modeling module 1108 and ART modeling module 1110 in order to optimize the data values to be more accurate and precise. Since there are many unknowns to compute at the same time, the joint inversion processing is a higher dimensional inversion problem, is relatively computationally expensive. This high dimensional inversion increases non-convexity of the problem and is more likely to produce non-unique and non-physical solutions. Accordingly, the joint inversion processing is an approach that may be more suited to applications where computational processing power, error correction capability, and time is not a controlling factor to conduct the formation evaluation. The joint inversion approach may be preferable for applications where the accuracy and precision of the formation evaluation is aided by the concurrent or simultaneous inversion calculation.

The processing device can execute one or more operations related to resistivity logging operations of one or both of the HFDT and ART resistivity logging tools. The processing device can execute instructions stored in the memory device to perform the operations. The processing device can include one processing device or multiple processing devices. Non-limiting examples of the processing device include a field-programmable gate array ("FPGA"), an application-specific integrated circuit ("ASIC"), a microprocessor, etc.

The processing device can be communicatively coupled to the memory device via the bus. The non-volatile memory device may include any type of memory device that retains stored information when powered off. Non-limiting examples of the memory device include electrically erasable programmable read-only memory ("ROM"), flash memory, or any other type of non-volatile memory. In some aspects, at least some of the memory device can include a non-transitory medium/memory device from which the processing device can read instructions. A non-transitory computer-readable medium can include electronic, optical, magnetic, or other storage devices capable of providing the processing device with computer-readable instructions or other program code. Non-limiting examples of a non-transitory computer-readable medium include (but are not limited to) magnetic disk(s), memory chip(s), ROM, random-access memory ("RAM"), an ASIC, a configured processor, optical storage, and/or any other medium from which a computer processor can read instructions. The instructions may include processor-specific instructions generated by a compiler and/or an interpreter from code written in any suitable computer-programming language, including, for example, C, C++, C#, Java, Python, Perl, JavaScript, etc.

FIG. 12 is a schematic representation of an apparatus and well system 1200 in which a resistivity logging tool 1210 can be deployed. The resistivity logging tool 1210 can include a HFDT 1208 and an ART 1212. In aspects, the schematic depicts an example wellbore system 1200 having a tool string 1206 (or casing string) that can extend into a wellbore 1204 cut into the earth strata 1202 of a formation. Although the wellbore system 1200 is depicted with one tool string 1206, any number of tools can be used in the wellbore system 1200. The wellbore 1204 can extend through various earth strata 1202, and may have substantively vertical sections and substantively horizontal sections. The tool string 1206 can include one or more sensory tools, and can further deliver and move such sensory tools through the vertical and horizontal sections of the wellbore 1204. In some applications, the tool string 1206 and sensory tools may be used in a wellbore 1204 that is only substantively vertical.

The resistivity logging tool 1210 can include multiple sensors. As illustrated in FIG. 12, the resistivity logging tool 1210 includes a HFDT 1208 and an ART 1212. Both the HFDT 1208 and the ART 1212 can measure or log data as they are being conveyed through the wellbore 1204, and can be configured for either or both of measurement-while-drilling (MWD) and logging-while-drilling (LWD) operation. The measurement of resistivity, invasions, dip, and other parameters with either or both of a HFDT 1208 and ART 1212 while drilling can allow for improved data collection regarding a well path, the position of a well in three-dimensional space, true vertical depth, bottom-hole location, the orientation of directional drilling systems, and the like. In some aspects, the resistivity logging tool 1210 can further include a processor to perform at least some calculations on data acquired by the HFDT 1208 and ART 1212 as described above. In further aspects, sensory tools in addition to an HFDT 1208 and ART 1212 can be mounted with or otherwise coupled to the resistivity logging tool 1210 or the tool string 1206.

In some aspects of the present disclosure, a formation evaluation system is provided having at least an array induction tool and a high-frequency dielectric tool that can be disposed in a wellbore and log resistivity data. Moreover, the system is capable of evaluating a formation and generating estimates of formation properties. In embodiments, the system includes a controller, a high-frequency dielectric tool (HFDT), which is operable to acquire HFDT formation data in a wellbore, an array induction resistivity tool (ART), which is operable to acquire ART formation data in a wellbore, a processing unit having a non-transitory computer-readable memory device in which instructions executable by the processing device are stored, where the controller is electronically coupled to, and operable to control, at least the HFDT, the AIT, and the processing unit. In aspects, the instructions in the processing unit memory device include instructions for estimating a first set of formation properties based on the ART formation data, instructions for determining the presence of an invasion in the formation based on the ART formation data, instructions for estimating a second set of formation properties based on the HFDT formation data, using the first set of formation properties as initial values for performing the HFDT estimation of the second set of formation properties, and instructions for outputting the first and/or second set of formation properties for further display, analysis, and/or manipulation. In embodiments, the system includes a multi-component and/or triaxial array induction tool. In embodiments, the system includes processing unit memory device instructions to align the HFDT formation data and ART formation data according to the depth from where the formation data was acquired. In further embodiments, the system also includes processing unit memory device instructions to, before the determination of the presence of an invasion, derive anisotropy and dipping corrections from the ART formation data and apply those corrections to the HFDT formation data. In other embodiments, the system includes processing unit memory device instructions to, when an invasion is determined to be present, use a mud resistivity and an invasion resistivity, derived from the first set of formation properties from the ART formation data, as initial constraint values for mud resistivity and formation resistivity, respectively, for the estimation of the second set of formation properties from the HFDT formation data. In such embodiments, the system also includes processing unit memory device instructions to, when an invasion is determined to not be present, use a mud resistivity and an horizontal formation resistivity, derived from the first set of formation properties from the ART formation data, as initial constraint values for mud resistivity and formation resistivity, respectively, for the estimation of the second set of formation properties from the HFDT formation data. In yet further embodiments, the system includes processing unit memory device instructions to determine if additional refinement of the second set of formation properties is performed. Such instructions, if additional refinement is determined to be needed, can control the system to repeat at least a portion of the evaluating of the formation, using the second set of formation properties as initial constraint values for repeating the estimating of the first set of formation properties. Such instructions, if additional refinement is determined to not be needed, can control the system to output the second set of formation properties for further display, analysis, and/or manipulation.

In other aspects, a method is provided. The method involves a high-frequency dielectric tool (HFDT), used at least in part to acquire HFDT formation data of a formation. The method also involves an array induction resistivity tool (ART), used at least in part to acquire ART formation data of a formation. The method further involves sending the HFDT formation data and ART formation data to a processing unit, estimating a first set of formation properties based on the ART formation data, determining the presence of an invasion in the formation based on the ART formation data, estimating a second set of formation properties based on the HFDT formation data, using the first set of formation properties as initial values for performing the HFDT estimation of the second set of formation properties, and outputting the first and/or second set of formation properties for further display, analysis, and/or manipulation. In embodiments, the method involves the use of a multi-component array induction tool. In further embodiments, the method involves, after the HFDT formation data and ART formation data are acquired, aligning the HFDT formation data and ART formation data are according to the depth from where the formation data was acquired. In aspects, the method involves, before the determination of the presence of an invasion, anisotropy and dipping corrections derived from the ART formation data applied to the HFDT formation data. In further aspects, the method involves determining an invasion to be present and subsequently using the first set of formation properties from the ART formation data, particularly using the mud resistivity and invasion resistivity, as initial constraint values for mud resistivity and formation resistivity, respectively, for estimating the second set of formation properties from the HFDT formation data. In other aspects, the method involves determining an invasion is not present and subsequently using the first set of formation properties from the ART formation data, particularly using the mud resistivity and horizontal formation resistivity, as initial constraint values for mud resistivity and formation resistivity, respectively, for estimating the second set of formation properties from the HFDT formation data. In further embodiments, the method includes determining if additional refinement of the second set of formation properties is needed, where, if additional refinement is determined to be needed, at least a portion of the method is repeated, with the second set of formation properties used as initial constraint values for repeating the estimating of the first set of formation properties; and if additional refinement is determined to not be needed, the second set of formation properties is output for further display, analysis, and/or manipulation.

In other aspects, an alternative method is provided, where the method includes acquiring HFDT formation data of a formation, acquiring ART formation data of the formation, sending the HFDT formation data and ART formation data to a joint inversion processing unit for concurrent processing, estimating a first set of formation properties based on the ART formation data, estimating a second set of formation properties based on the HFDT sensory, and outputting the first and second set of formation properties for further display, analysis, and/or manipulation. In embodiments, the method involves the use of a multi-component array induction tool. In further embodiments, the method involves, after the HFDT formation data and ART formation data are acquired, aligning the HFDT formation data and ART formation data are according to the depth from where the formation data was acquired. In aspects, the method involves, before the determination of the presence of an invasion, anisotropy and dipping corrections derived from the ART formation data applied to the HFDT formation data. In further aspects, the method involves determining an invasion to be present and subsequently using the first set of formation properties from the ART formation data, particularly using the mud resistivity and invasion resistivity, as initial constraint values for mud resistivity and formation resistivity, respectively, for estimating the second set of formation properties from the HFDT formation data. In other aspects, the method involves determining an invasion is not present and subsequently using the first set of formation properties from the ART formation data, particularly using the mud resistivity and horizontal formation resistivity, as initial constraint values for mud resistivity and formation resistivity, respectively, for estimating the second set of formation properties from the HFDT formation data. In further embodiments, the method includes determining if additional refinement of the second set of formation properties is needed, where, if additional refinement is determined to be needed, at least a portion of the method is repeated, with the second set of formation properties used as initial constraint values for repeating the estimating of the first set of formation properties; and if additional refinement is determined to not be needed, the second set of formation properties is output for further display, analysis, and/or manipulation.

In other aspects, a controller is provided. The controller can include a processing device and a memory device in which instructions executable by the processing device are stored. The instructions can be executed by the processing device to perform operations.

The foregoing description of the disclosure, including illustrated aspects and examples has been presented only for the purpose of illustration and description and is not intended to be exhaustive or to limit the disclosure to the precise forms disclosed. Numerous modifications, adaptations, and uses thereof will be apparent to those skilled in the art without departing from the scope of this disclosure. Aspects and features from each disclosed example can be combined with any other example.

What is claimed is:

1. A method comprising:
   acquiring, with an array induction resistivity tool, a first set of formation data of a formation;
   acquiring, with a high-frequency dielectric tool, a second set of formation data of the formation;
   concurrently determining, by a processing unit:
     a first set of formation properties based on the first set of formation data acquired from the array induction resistivity tool and a second set of formation properties determined from the second set of formation data acquired from the high frequency dielectric tool; and
     the second set of formation properties based on the second set of formation data acquired from the high frequency dielectric tool and the first set of formation properties determined from the first set of formation data acquired from the array induction resistivity tool; and outputting at least one of the first set of formation properties and the second set of formation properties, wherein the first set of formation properties and the second set of formation properties are aligned with each other.

2. The method of claim 1, wherein the array induction resistivity tool is a multi-component array induction resistivity tool.

3. The method of claim 2, further comprising applying anisotropy corrections to the second set of formation data acquired from the high frequency dielectric tool, wherein the anisotropy corrections are determined from the first set of formation data acquired from the array induction resistivity tool.

4. The method of claim 2, further comprising applying dipping corrections to the second set of formation data acquired from the high frequency dielectric tool, wherein the dipping corrections are determined from the first set of formation data acquired from the array induction resistivity tool.

5. The method of claim 1, further comprising aligning the second set of formation data acquired from the high frequency dielectric tool and the first set of formation data acquired from the array induction resistivity tool according to a depth at which the first and second sets of formation data was acquired by both the high frequency dielectric tool and the array induction resistivity tool.

6. The method of claim 1, further comprising
determining whether an invasion is present; and
performing at least one of:
based on determining the invasion is present, using a first mud resistivity value and an invasion resistivity value from the first set of formation properties as initial constraint values for a second mud resistivity and a formation resistivity, respectively, in determining the second set of formation properties based on the data acquired from the high frequency dielectric tool; and
based on determining the invasion is absent, using the first mud resistivity and an horizontal formation resistivity from the first set of formation properties as initial constraint values for the second mud resistivity and the formation resistivity, respectively, in determining the second set of formation properties based on the data acquired from the high frequency dielectric tool.

7. The method of claim 1, further comprising determining if additional refinement of the second set of formation properties is to be performed;
wherein if additional refinement is determined to be performed, at least a portion of the method is repeated, with the second set of formation properties used as initial constraint values for repeating the determining of the first set of formation properties; and
wherein if additional refinement is determined to not be performed, at least one of the first set of formation properties or the second set of formation properties is output.

8. The method of claim 1, further comprising:
calculating, with an array induction resistivity tool modeling module, a set of array induction parameters, used by the processing unit in determining the first set of formation properties; and calculating, with a high frequency dielectric tool modeling module, a set of high frequency dielectric parameters, used by the processing unit in determining the second set of formation properties.

9. The method according to claim 1, wherein the processing unit concurrently determines the first set of formation properties and the second set of formation properties by a joint inversion process.

10. A system for evaluating a formation and generating estimates of formation properties comprising:
a controller;
a processing unit having a non-transitory computer-readable memory device in which instructions executable by the processing device are stored;
wherein the controller is configured to process data acquired from one or both of an array induction resistivity tool and a high frequency dielectric tool;
wherein the instructions stored in the memory device comprise:
instructions for acquiring a first set of data from the array induction resistivity tool;
instructions for acquiring a second set of data from the high frequency dielectric tool;
instructions for determining a first set of formation properties based on the first set of data acquired from the array induction resistivity tool;
instructions for determining a second set of formation properties based on the second set of data acquired from the high frequency dielectric tool and the first set of formation properties determined from the data acquired from the array induction resistivity tool; and
instructions for outputting at least one or both of the first and second sets of formation properties, wherein the first set of formation properties and the second set of formation properties are aligned with each other.

11. The system according to claim 10, wherein the controller is communicatively coupled to and operable to control the array induction resistivity tool.

12. The system according to claim 11, wherein the array induction resistivity tool is a multi-component array induction tool.

13. The system of claim 11, wherein the instructions further comprise instructions to determine anisotropy corrections from the data acquired from the array induction resistivity tool and apply the anisotropy corrections to the data acquired from the high frequency dielectric tool.

14. The system of claim 11, wherein the instructions further comprise instructions to determine dipping corrections from the data acquired from the array induction resistivity tool and apply those dipping corrections to the data acquired from the high frequency dielectric tool.

15. The system according to claim 10, wherein the controller is communicatively coupled to and operable to control the high frequency dielectric tool.

16. The system of claim 10, wherein the instructions further comprise instructions to align the data acquired from the high frequency dielectric tool and the data acquired from the array induction resistivity tool according to the depth from where the data from both the high frequency dielectric tool and the array induction resistivity tool was acquired.

17. The system of claim 10, wherein the instructions further comprise:
instructions for determining the presence of an invasion in the formation based data acquired from the array induction resistivity tool;

instructions, when an invasion is determined to be present, to use a first mud resistivity value and an invasion resistivity value determined from the first set of formation properties as initial constraint values for a second mud resistivity and a formation resistivity, respectively, in order to determine the second set of formation properties based on the data acquired from the high frequency dielectric tool; and instructions, when an invasion is determined to be absent, to use the first mud resistivity and a horizontal formation resistivity, determined from the first set of formation properties from the data acquired from the array induction resistivity tool, as initial constraint values for the second mud resistivity and the formation resistivity, respectively, in order to determine the second set of formation properties from the data acquired from the high frequency dielectric tool.

18. The system of claim 10, wherein the instructions further comprise:

instructions to determine if additional refinement of the second set of formation properties is performed;

instructions, if additional refinement is determined to be performed, to repeat at least some of the instructions executable by the processing, using the second set of formation properties as initial constraint values for repeating the determination of the first set of formation properties; and instructions, if additional refinement is determined to not be performed, to output at least one of the first set of formation properties or the second set of formation properties.

19. The system of claim 10, wherein the instructions further comprise:

instructions for calculating with an array induction resistivity tool modeling module, a set of array induction parameters, used by the processing unit in determining the first set of formation properties; and instructions for calculating with a high frequency dielectric tool modeling module, a set of high frequency dielectric parameters, used by the processing unit in determining the second set of formation properties.

* * * * *